(12) United States Patent
Peana et al.

(10) Patent No.: US 10,964,255 B2
(45) Date of Patent: Mar. 30, 2021

(54) SYSTEM AND METHOD OF COMPENSATION OF A DISPLAY

(71) Applicant: Dell Products L.P., Round Rock, TX (US)

(72) Inventors: Stefan Peana, Austin, TX (US); Mitch Anthony Markow, Hutto, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/654,566

(22) Filed: Oct. 16, 2019

(65) Prior Publication Data

US 2020/0118483 A1    Apr. 16, 2020

Related U.S. Application Data

(63) Continuation of application No. 16/158,877, filed on Oct. 12, 2018.

(51) Int. Cl.
| | |
|---|---|
| *G09G 3/32* | (2016.01) |
| *G06F 3/041* | (2006.01) |
| *G01B 7/16* | (2006.01) |
| *G09F 9/30* | (2006.01) |

(52) U.S. Cl.
CPC ............ *G09G 3/32* (2013.01); *G01B 7/18* (2013.01); *G06F 3/0412* (2013.01); *G06F 3/0414* (2013.01); *G09F 9/301* (2013.01); *G09G 2320/028* (2013.01); *G09G 2320/068* (2013.01); *G09G 2320/0626* (2013.01)

(58) Field of Classification Search
CPC ....... G01B 7/18; G06F 3/0412; G06F 3/0414; G09G 3/32; G09G 2320/0233; G09G 2320/028; G09G 2320/0626; G09G 2320/068; G09G 2354/00; G09G 2380/02; G09F 9/301
See application file for complete search history.

(56) References Cited

U.S. PATENT DOCUMENTS

| | | | |
|---|---|---|---|
| 10,504,421 B1 * | 12/2019 | Peana | ................... G06F 3/0414 |
| 2014/0267097 A1 | 9/2014 | Lee et al. | |
| 2015/0301672 A1 | 10/2015 | Kim et al. | |

(Continued)

OTHER PUBLICATIONS

Cuervo, Eduardo, Krishna Chintalapudi, and Manikanta Kotaru. "Creating the Perfect Illusion: What will it take to Create Life-Like Virtual Reality Headsets?" *Proceedings of the 19th International Workshop on Mobile Computing Systems & Applications.* ACM, 2018; 6 pages.

*Primary Examiner* — Stacy Khoo
(74) *Attorney, Agent, or Firm* — Baker Botts L.L.P.

(57) ABSTRACT

In one or more embodiments, one or more systems, methods, and/or processes may determine first multiple brightness settings of pixels of a display; may determine an angle of an observation point with respect to a position associated with the display; may determine second multiple brightness settings of the pixels of the display based at least on the first multiple brightness settings and the angle of the observation point; and may display, via the display, an image utilizing the second multiple brightness settings. In one or more embodiments, the one or more systems, methods, and/or processes may further receive information from a tracking device.

20 Claims, 22 Drawing Sheets

(56) References Cited

U.S. PATENT DOCUMENTS

2018/0082632 A1\* 3/2018 Lee ..................... G09G 3/3233
2018/0275847 A1\* 9/2018 Li ......................... G06F 3/0484
2019/0005879 A1    1/2019 Shin \* cited by examiner

SYSTEM AND METHOD OF COMPENSATION OF A DISPLAY

BACKGROUND

Field of the Disclosure

This disclosure relates generally to information handling systems and more particularly to compensating for distortions that may arise from displays.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine first multiple brightness settings of pixels of a display; may determine an angle of an observation point with respect to a position associated with the display; may determine second multiple brightness settings of the pixels of the display based at least on the first multiple brightness settings and the angle of the observation point; and may display, via the display, an image utilizing the second multiple brightness settings. In one or more embodiments, the one or more systems, methods, and/or processes may further receive information from a tracking device. For example, determining the angle of the observation point with respect to the position associated with the display may include determining the angle of the observation point with respect to the position associated with the display based at least on the information from the tracking device. In one or more embodiments, the tracking device may include one or more image sensors.

In one or more embodiments, one or more systems, methods, and/or processes may determine first brightness settings of pixels of a display; may determine curve determinations from strain gauges associated with the display; and may determine, from the curve determinations, vectors, where each of the plurality of vectors is orthogonal to the display at a respective position of the display. In one or more embodiments, the one or more systems, methods, and/or processes may further determine second brightness settings of the pixels of the display based at least on the first brightness settings and the vectors. For example, a graphics processing unit may determine second brightness settings of the pixels of the display based at least on the first brightness settings and the vectors. In one or more embodiments, the one or more systems, methods, and/or processes may further display, via the display, an image utilizing the second brightness settings.

In one or more embodiments, determining the second brightness settings may include adjusting the first brightness settings. For example, adjusting the first brightness settings may include accessing a lookup table that includes brightness adjustments associated with angles and looking up, from the lookup table, adjustments to the first brightness settings based at least on angles of the vectors with respect to an observation point. In one or more embodiments, determining the curve determinations from the strain gauges may include determining the curve determinations from voltages from the strain gauges. For example, the voltages from the strain gauges may be converted to digital data via analog to digital conversions.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
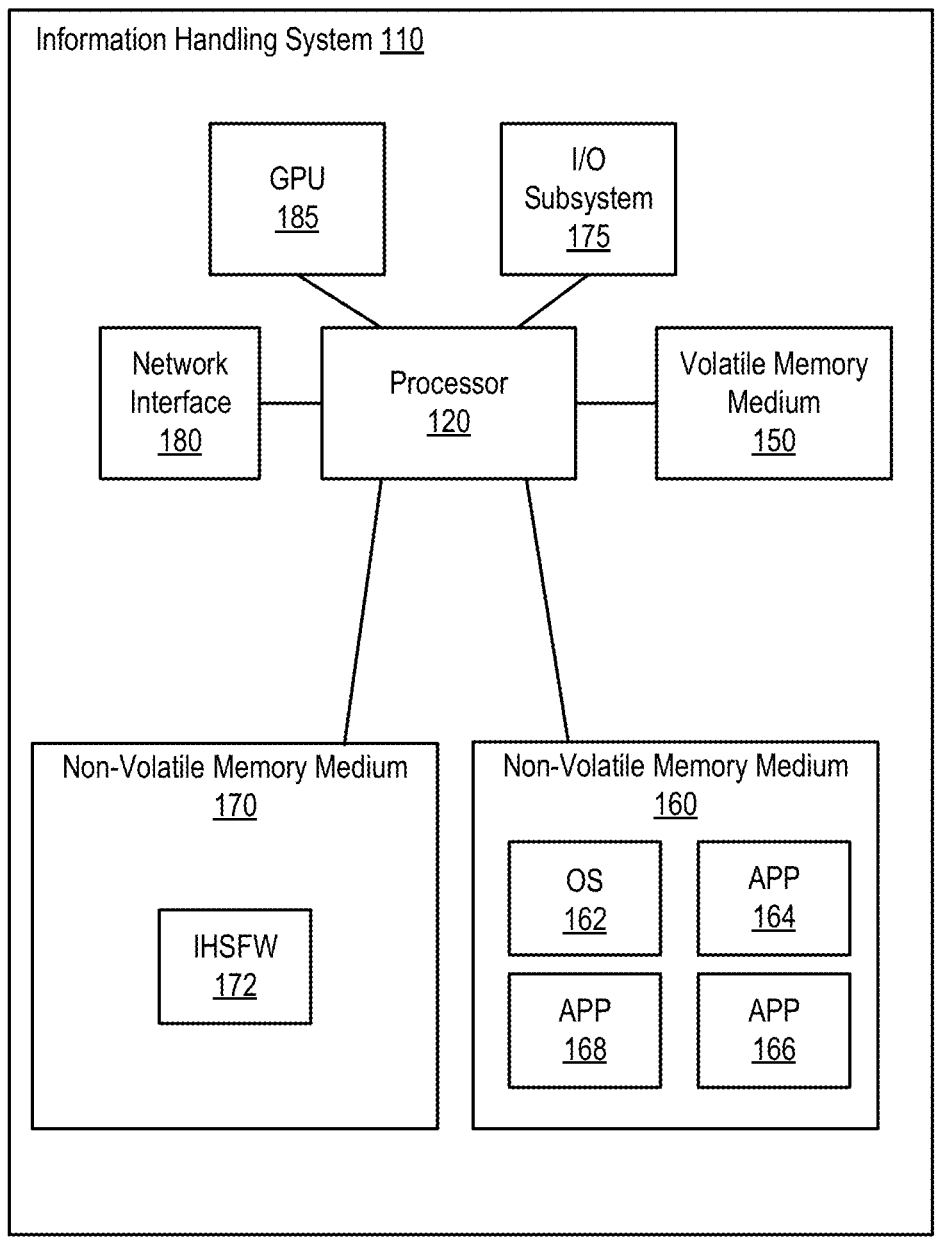
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a display may be shaped to different form factors. For example, hand-held devices (e.g., smart phones, tablets, etc.) may include one or more curves. For instance, displays may be fitted and/or applied to the one or more curves, which may produce curved displays. In one or more embodiments, one or more curves of a display affect one or more angles at which information of the display may be view. For example, light emitted from a display with one or more curves may be directed to different directions. In one or more embodiments, light emitted from the display may compensate for the one or more curves which may direct the light emitted from the display to different directions. For example, light emitted from pixels of the display may be adjusted based at least on the one or more curves of the display.

In one or more embodiments, one or more curves of a display may be determined. For example, determining the one or more curves of the display may include utilizing strain gauges. For instance, the strain gauges may determine the one or more curves of the display by measuring tension and/or compression. In one or more embodiments, information from the strain gauges may be utilized in determining vectors that are orthogonal to the display. For example, the vectors may be utilized in determining a two-dimensional map or a three-dimensional map of the display. In one or more embodiments, information from the strain gauges may be converted into a lookup table. For example, data from the lookup table may be utilized in determining emitting light from the display. For instance, the data from the lookup table may be utilized in adjusting light emitted from pixels of the display based at least on the one or more curves of the display.

In one or more embodiments, adjusting light emitted from pixels of the display may include adjusting the lookup table. For example, an adjusted lookup table may be created from adjusting the lookup table. For instance, the adjusted lookup table may be utilized in determining emitting light from the pixels of the display. In one or more embodiments, a graphics processing unit may utilize the adjusted lookup table to modify light emitted from the pixels of the display. For example, the graphics processing unit may modify an image processed prior to image buffering so that a new image is compensated for the one or more curves of the display. In one instance, the new image may appear to a person as if the one or more curves of the display were not present. In another instance, the new image may appear to a person as if the one or more curves of the display were not as pronounced or were not as great.

Turning now to FIG. 1A, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a graphics processing unit (GPU) 185. As illustrated, volatile memory medium 150, non-volatile memory media 160 and 170, I/O subsystem 175, network interface 180, and GPU 185 may be communicatively coupled to processor 120.

In one or more embodiments, one or more of volatile memory medium 150, non-volatile memory media 160 and 170, I/O subsystem 175, network interface 180, and GPU 185 may be communicatively coupled to processor 120 via one or more buses, one or more switches, and/or one or more root complexes, among others. In one example, one or more of volatile memory medium 150, non-volatile memory media 160 and 170, I/O subsystem 175, network interface 180, and GPU 185 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, GPU 185 may manipulate and/or alter memory to accelerate creation of one or more images in a frame buffer intended for output to a display device. In one example, GPU 185 may be utilized to perform the memory-intensive work such as texture mapping and/or rendering polygons. In a second example, GPU 185 may be utilized to perform geometric calculations such as rotations and/or translations of vertices into different coordinate systems. In another example, GPU 185 may perform one or more computations associated with three-dimensional graphics. In one or more embodiments, GPU 185 may be utilized in oversampling and/or interpolation method and/or processes. For example, GPU 185 may be utilized to reduce aliasing.

In one or more embodiments, GPU 185 may include multiple parallel processors. For example, the multiple parallel processors may be utilized to implement one or more methods and/or processes that involve one or more matrix and/or vector operations, among others. In one or more embodiments, GPU 185 may execute GPU processor instructions in implementing one or more systems, flowcharts, methods, and/or processes described herein. In one example, GPU 185 may execute GPU processor instructions from one or more of memory media 150-170 in implementing one or more systems, flowcharts, methods, and/or processes described herein. In another example, GPU 185 may execute GPU processor instructions via network interface 180 in implementing one or more systems, flowcharts, methods, and/or processes described herein.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
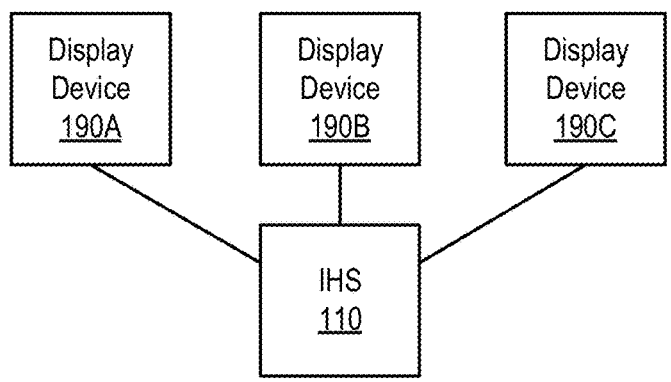
FIG. 1B illustrates an example of an information handling system coupled to one or more display devices, according to one or more embodiments.

Turning now to FIG. 1B, an example of an information handling system coupled to one or more display devices is illustrated, according to one or more embodiments. As shown, IHS 110 may be coupled to one or more of display devices 190A-190C.

Figure 1C:
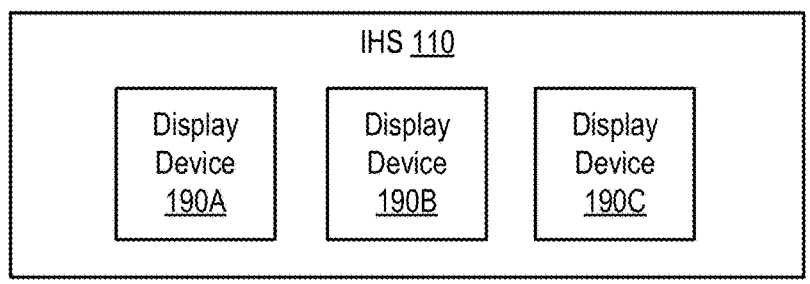
FIG. 1C illustrates an example of an information handling system that includes one or more display devices, according to one or more embodiments.

Turning now to FIG. 1C, an example of an information handling system that includes one or more display devices is illustrated, according to one or more embodiments. As shown, IHS 110 may include one or more of display devices 190A-190C.

Figure 1D:
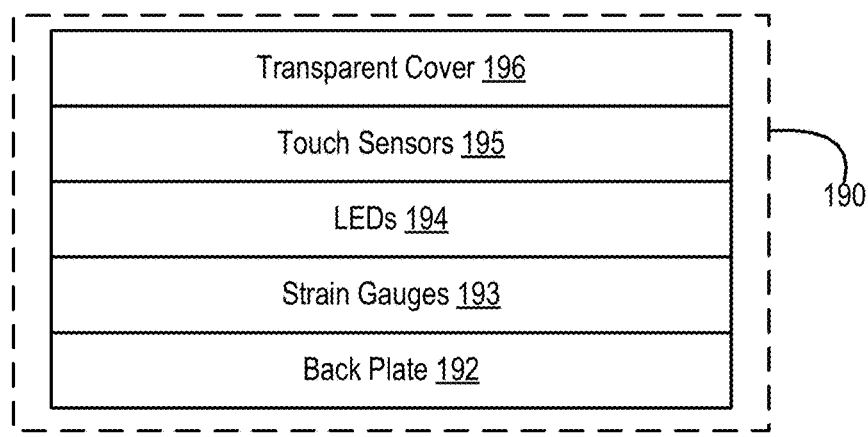
FIG. 1D illustrates an example of a portion of a display device, according to one or more embodiments.

Turning now to FIG. 1D, an example of a portion of a display device is illustrated, according to one or more embodiments. As shown, display device 190 may include a back plate 192, strain gauges 193, light emitting diodes (LEDs) 194, touch sensors 195, and a transparent cover 196. Although strain gauges 193, LEDs 194, and touch sensors 195 appear to be ordered in FIG. 1D, an implementation may utilize any suitable ordering, according to one or more embodiments.

In one or more embodiments, LEDs 194 may be or include organic LEDs (OLEDs). In one example, OLEDs may be driven with a passive matrix (PMOLED). For instance, each row and line in display 190 may be controlled sequentially, such as one by one. In another example, OLEDs may be driven with an active matrix (AMOLED). For instance, controlling OLEDs with AMOLED may include utilizing a transistor backplane that may access and/or may switch each individual pixel on or off, which may permit and/or allow for higher resolution and/or larger display sizes. In one or more embodiments, a pixel of display 190 may include three LEDs. For example, a pixel of display 190 may include a first light emitting diode (LED) that emits light in a "red" portion of a visual spectrum, a second LED that emits light in a "green" portion of the visual spectrum, and a third LED that emits light in a "blue" portion of the visual spectrum. In one or more embodiments, back plate 192, strain gauges 193, LEDs 194, touch sensors 195, and transparent cover 196 may be flexible. For example, display 190 may be or include a flexible display.

In one or more embodiments, emitting display may be generally considered to be emitted light from a display that could be emissive, transmissive, transflective, reflective, or retro-reflective, among others. For example, emissive display may include OLEDs and/or micro-LEDs, among others. In one or more embodiments, transmissive or transflective may include LED, reflective, and/or retro-reflective, which may be considered to be an electrophoretic or other emerging structures. In one or more embodiments, a display (e.g., display 190) may modulate light emitted from a pixel via controlling light emission and/or via controlling an aperture opening associated with a pixel, such that one or more appropriate amounts of light are transmitted.

Figure 2A:
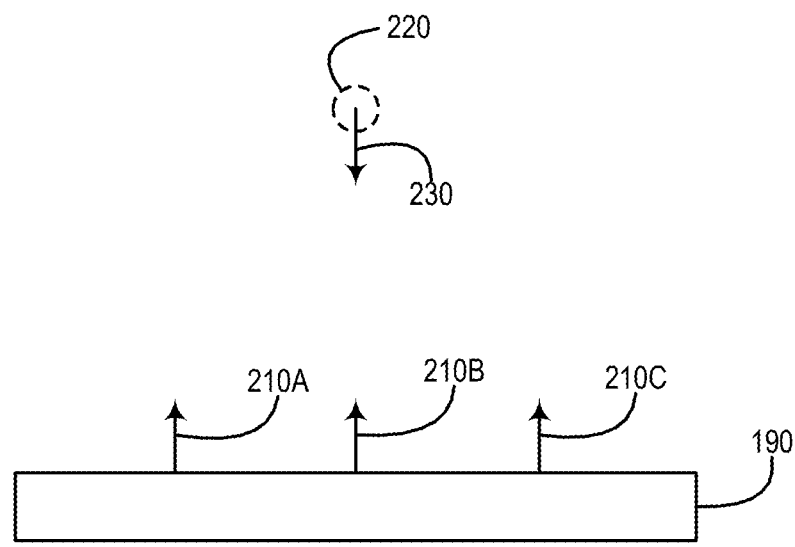
FIG. 2A illustrates an example of a cross section of a display and an observation point, according to one or more embodiments.

Turning now to FIG. 2A, a cross section of a display and an observation point are illustrated, according to one or more embodiments. In one or more embodiments, light may be emitted from display 190. For example, light emitted from display 190 in directions associated with vectors 210A-210C. For instance, one or more first pixels of display 190 may be associated with vector 210A, one or more second pixels of display 190 may be associated with vector 210B, and/or one or more third pixels of display 190 may be associated with vector 210C. In one or more embodiments, a pixel of display 190 may include one or more LEDs. As shown, an observation point 220 may be associated with a vector 230, which may indicate a direction of observation point 220. As illustrated, vectors 210A-210C and/or vector 230 are parallel. In one or more embodiments, if vector 230 is parallel with a vector 210, a luminous intensity (e.g., a brightness) may not be diminished. For example, light emitted, from display 190, associated with vector 210B may not have a diminished luminous intensity from observation point 220.

Figure 2B:
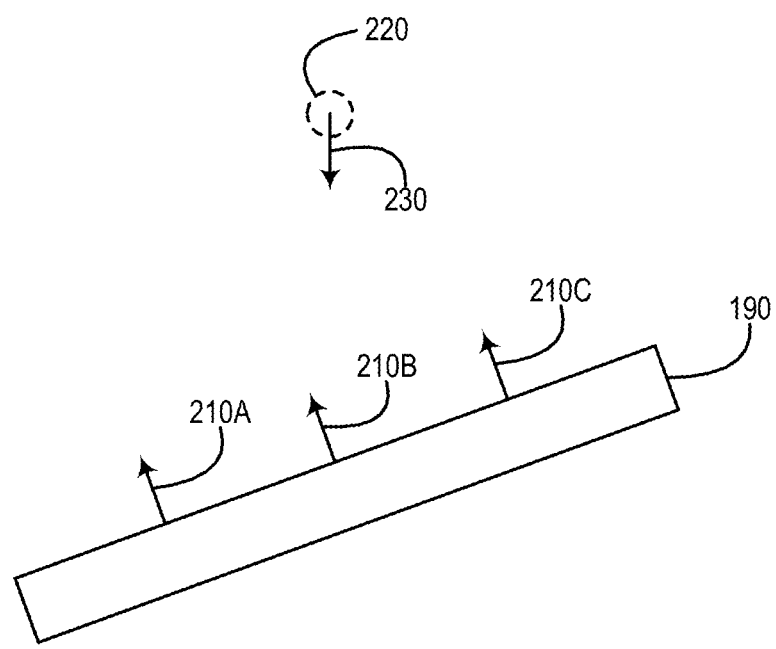
FIG. 2B illustrates an example of a cross section of a tilted display and an observation point, according to one or more embodiments.

Turning now to FIG. 2B, a cross section of a tilted display and an observation point are illustrated, according to one or more embodiments. As shown, display 190 may be tilted. For example, display 190 may be tilted at an angle. For instance, an angle of tilt of display 190 may be with reference to vector 230, which may indicate a direction of observation point 220. In one or more embodiments, one or more luminous intensities of light emitted from display 190 in directions associated with vectors 210A-210C may be diminished, as vectors 210A-210C and vector 230 are not parallel. For example, one or more luminous intensities of light emitted from one or more pixels, of display 190, associated with vector 210B may be diminished. In one or more embodiments, one or more luminous intensities of light emitted from one or more pixels, of display 190, associated with vector 210B may be increased. For example, one or more luminous intensities of light emitted from one or more pixels associated with vector 210B may be increased such that the one or more luminous intensities of light emitted from the one or more pixels associated with vector 210B appear at observation point 220 as though display 190 was not tilted at an angle. For instance, one or more luminous intensities of light emitted from one or more pixels associated with vector 210B may be increased such that the one or more luminous intensities of light emitted from the one or more pixels associated with vector 210B appear at observation point 220 as though display 190 was in an orientation as illustrated in FIG. 2A.

Figure 2C:
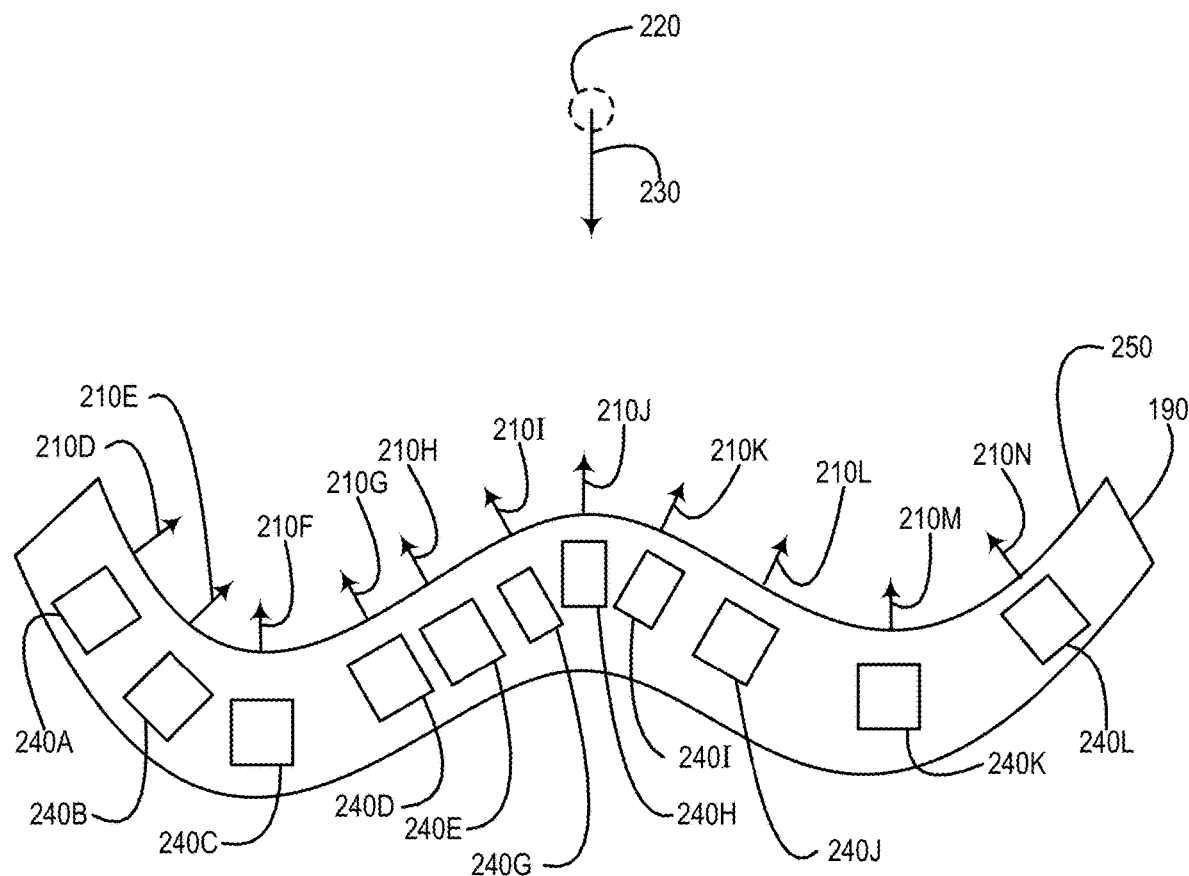
FIG. 2C illustrates an example of a cross section of a curved display and an observation point, according to one or more embodiments.

Turning now to FIG. 2C, a cross section of a curved display and an observation point are illustrated, according to one or more embodiments. As shown, display 190 may be a flexible and/or curved display. As illustrated, one or more of vectors 210D-210N may not be parallel with vector 230, which may indicate a direction of observation point 220. In one or more embodiments, one or more luminous intensities of light emitted from display 190 in directions associated with vectors 210D-210I and 210K-10N may be diminished, as vectors 210D-210I and 210K-10N may not be not parallel with vector 230. For example, one or more luminous intensities of light emitted from one or more pixels, of display 190, associated with respective vectors 210D-210I and 210K-10N may be diminished. In one instance, one or more luminous intensities of light emitted from one or more pixels, of display 190, associated with vector 210I may be diminished. In a second instance, one or more luminous intensities of light emitted from one or more pixels, of display 190, associated with vector 210K may be diminished. In another instance, one or more luminous intensities of light emitted from one or more pixels, of display 190, associated with vector 210N may be diminished.

In one or more embodiments, display 190 may include multiple strain gauges. As illustrated, display 190 may include strain gauges 240A-240L, which may be distributed throughout display 190. In one or more embodiments, strain gauges 240A-240L may be utilized in determining one or more vectors that are orthogonal to a face 250 of display 190. As shown, face 250 may be curved. For example, strain gauges 240A-240L may be utilized in determining vectors 210D-210N that are orthogonal to face 250. In one or more embodiments, a vector 210 may be determined via utilizing one or more of strain gauges 240. In one example, vector 210D may be determined via utilizing strain gauge 240A. In a second example, vector 210H may be determined via utilizing strain gauge 240E. In another example, vector 210H may be determined via utilizing strain gauges 240D-240G.

Figure 2D:
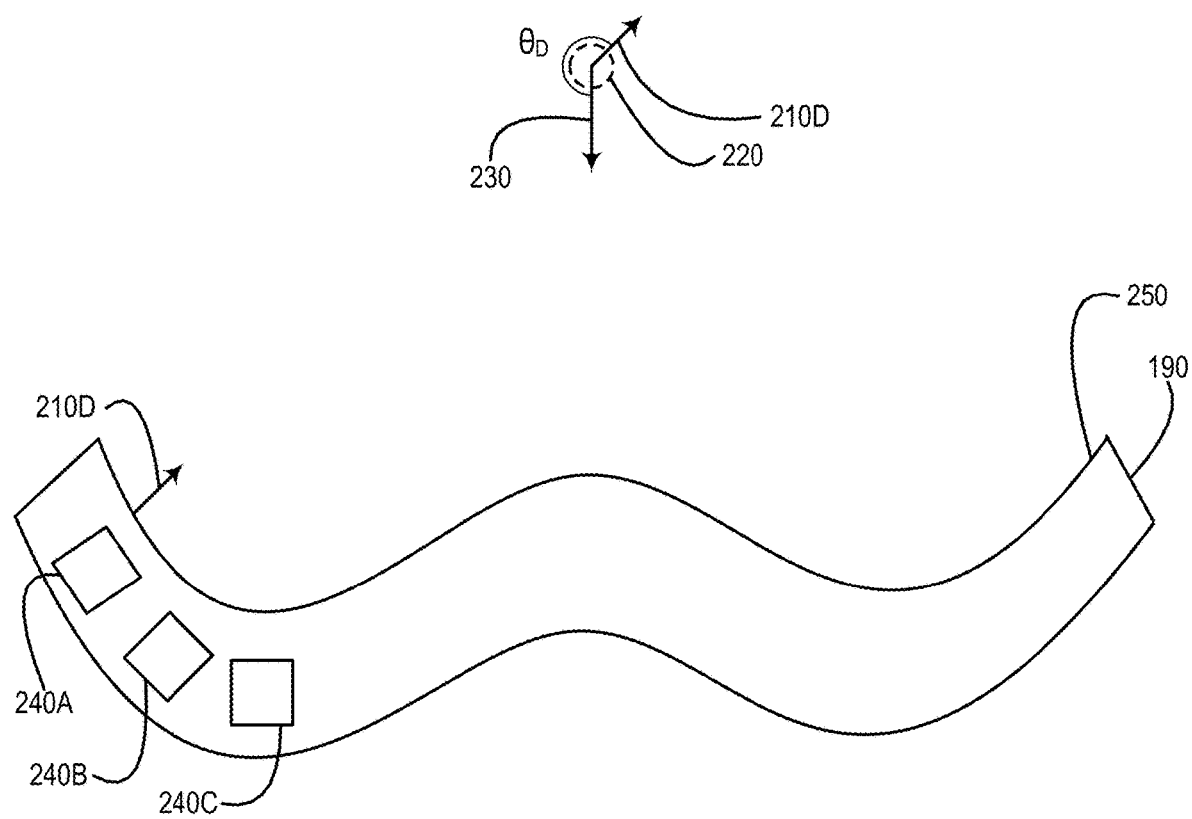
FIG. 2D illustrates an example of a cross section of a curved display, an observation point, and an angle of a first vector, according to one or more embodiments.

Turning now to FIG. 2D, a cross section of a curved display, an observation point, and an angle of a first vector are illustrated, according to one or more embodiments. As shown, vector 210D may be at an angle $\theta_D$ with respect to vector 230. In one or more embodiments, one or more pixels of display 190 may be adjusted based at least on angle $\theta_D$ and/or vector 210D. For example, a luminous intensity of one or more pixels of display 190 may be adjusted based at least on angle $\theta_D$ and/or vector 210D. For instance, the one or more pixels of display 190 that may be adjusted based at least on angle $\theta_D$ and/or vector 210D may be proximate to a position of surface 250 where vector 210D is orthogonal to surface 250.

Figure 2E:
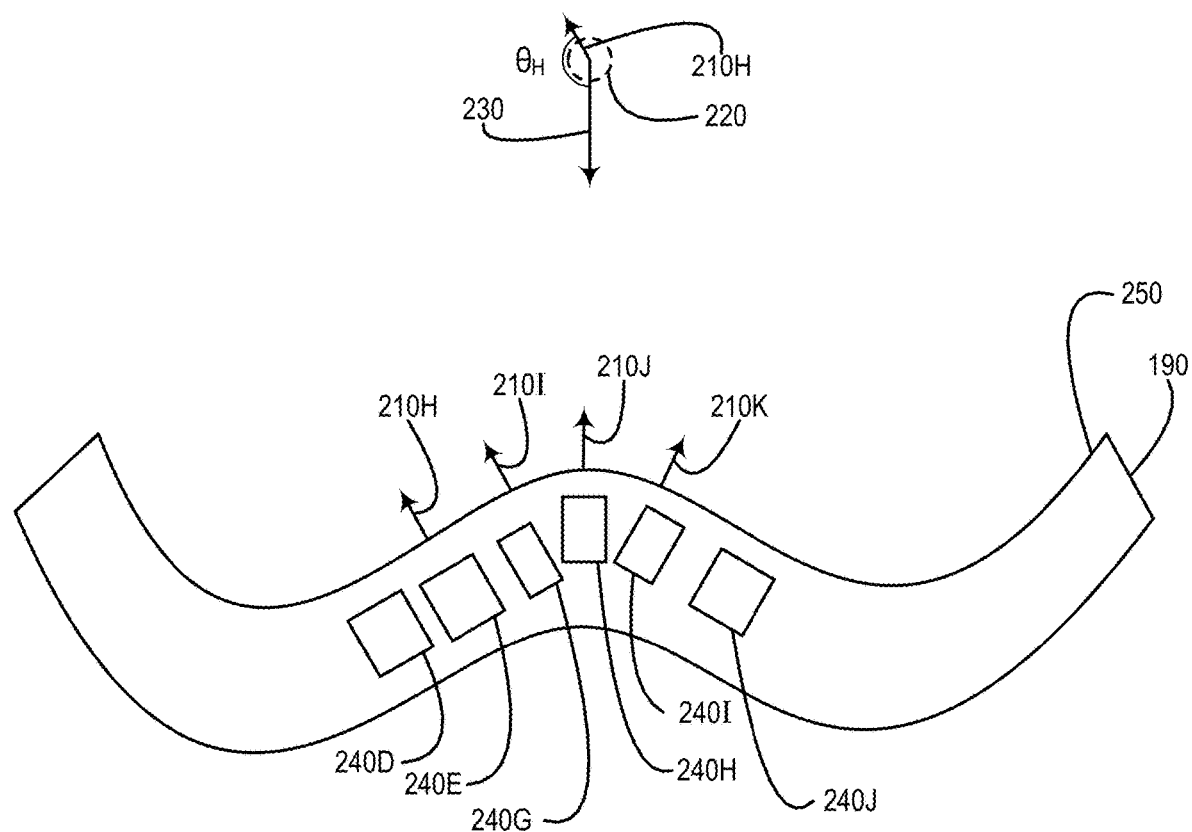
FIG. 2E illustrates an example of a cross section of a curved display, an observation point, and an angle of a second vector, according to one or more embodiments.

Turning now to FIG. 2E, a cross section of a curved display, an observation point, and an angle of a second vector are illustrated, according to one or more embodiments. As shown, vector 210H may be at an angle $\theta_H$ with respect to vector 230. In one or more embodiments, one or more pixels of display 190 may be adjusted based at least on angle $\theta_H$ and/or vector 210H. For example, a luminous intensity of one or more pixels of display 190 may be adjusted based at least on angle $\theta_H$ and/or vector 210H. For instance, the one or more pixels of display 190 that may be adjusted based at least on angle $\theta_H$ and/or vector 210H may be proximate to a position of surface 250 where vector 210H is orthogonal to surface 250.

Figure 2F:
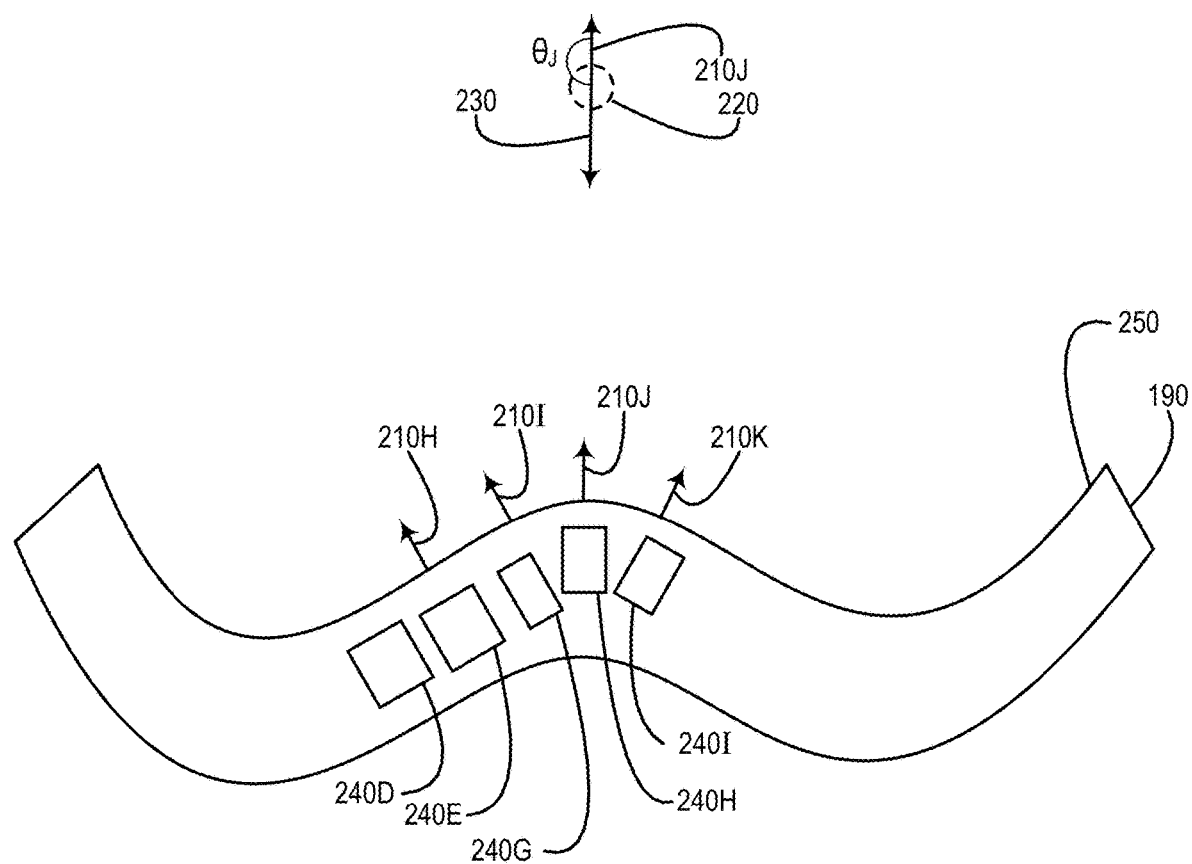
FIG. 2F illustrates another example of a cross section of a curved display, an observation point, and an angle of a third vector, according to one or more embodiments.

Turning now to FIG. 2F, a cross section of a curved display, an observation point, and an angle of a third vector are illustrated, according to one or more embodiments. As shown, vector 210J may be at an angle $\theta_J$ with respect to vector 230. In one or more embodiments, one or more pixels of display 190 may be adjusted based at least on angle $\theta_J$ and/or vector 210J. For example, a luminous intensity of one or more pixels of display 190 may be adjusted based at least on angle $\theta_J$ and vector 210J. For instance, the one or more pixels of display 190 that may be adjusted based at least on angle $\theta_J$ and/or vector 210H may be proximate to a position of surface 250 where vector 210J is orthogonal to surface 250. In one or more embodiments, one or more pixels of display 190 may not be adjusted based at least on angle $\theta_J$ and/or vector 210J. For example, vector 210J may be parallel to vector 230. In one instance, an angle between vector 210J and vector 230 zero radians. In another instance, an angle between vector 210J and vector 230 may be $\pi$ radians.

Figure 2G:
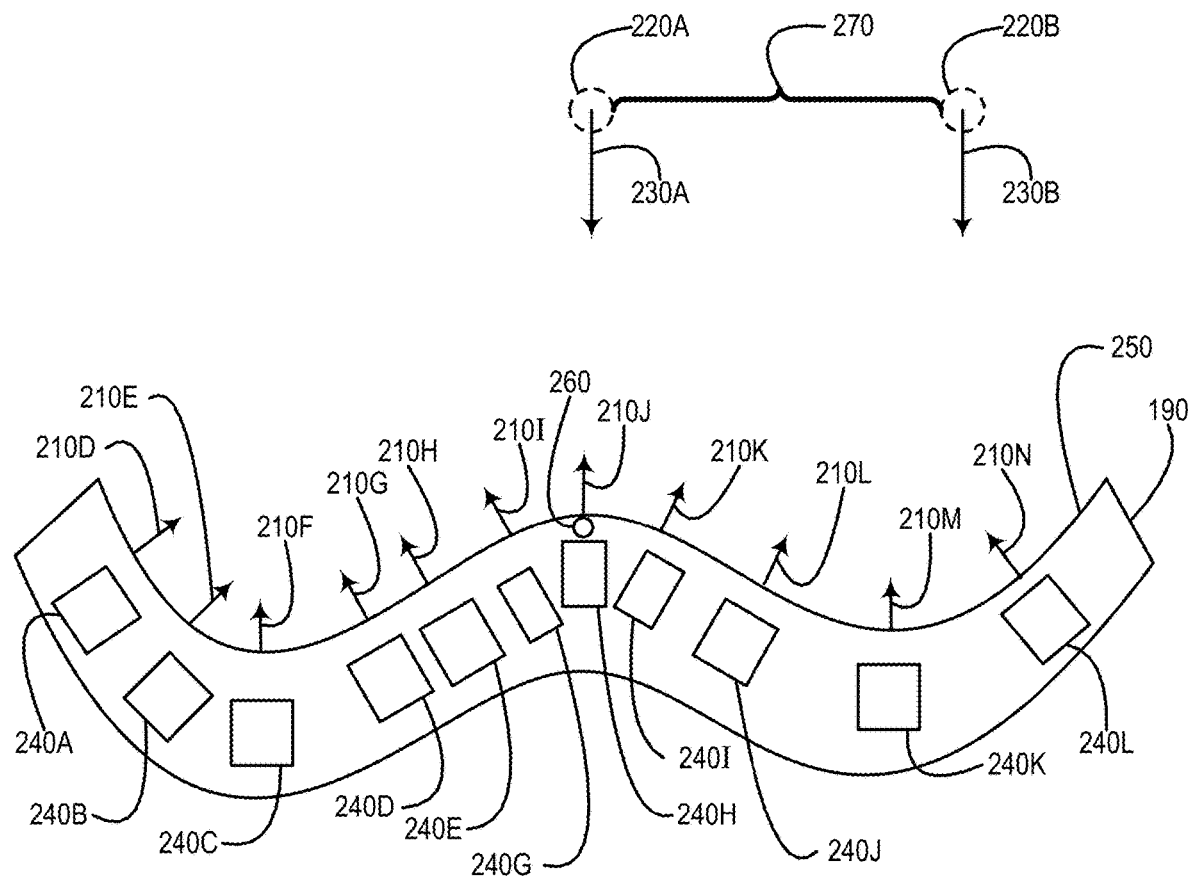
FIG. 2G illustrates an example of a cross section of a curved display and observation points, according to one or more embodiments.

Turning now to FIG. 2G, an example of a cross section of a curved display and observation points are illustrated, according to one or more embodiments. As shown, an observation point 220A may be observation point 220 as illustrated in FIGS. 2A-2F. As illustrated, an observation point 220B may be a distance 270 from observation point 220A. In one or more embodiments, one or more pixels of display 190 may appear different at observation point 220B than the one or more pixels of display 190 may appear at observation point 220A. For example, the one or more pixels of display 190 may appear different at observation point 220B than the one or more pixels of display 190 may appear at observation point 220A based at least on an angle with respect to a position 260 of display 190.

Figure 2H:
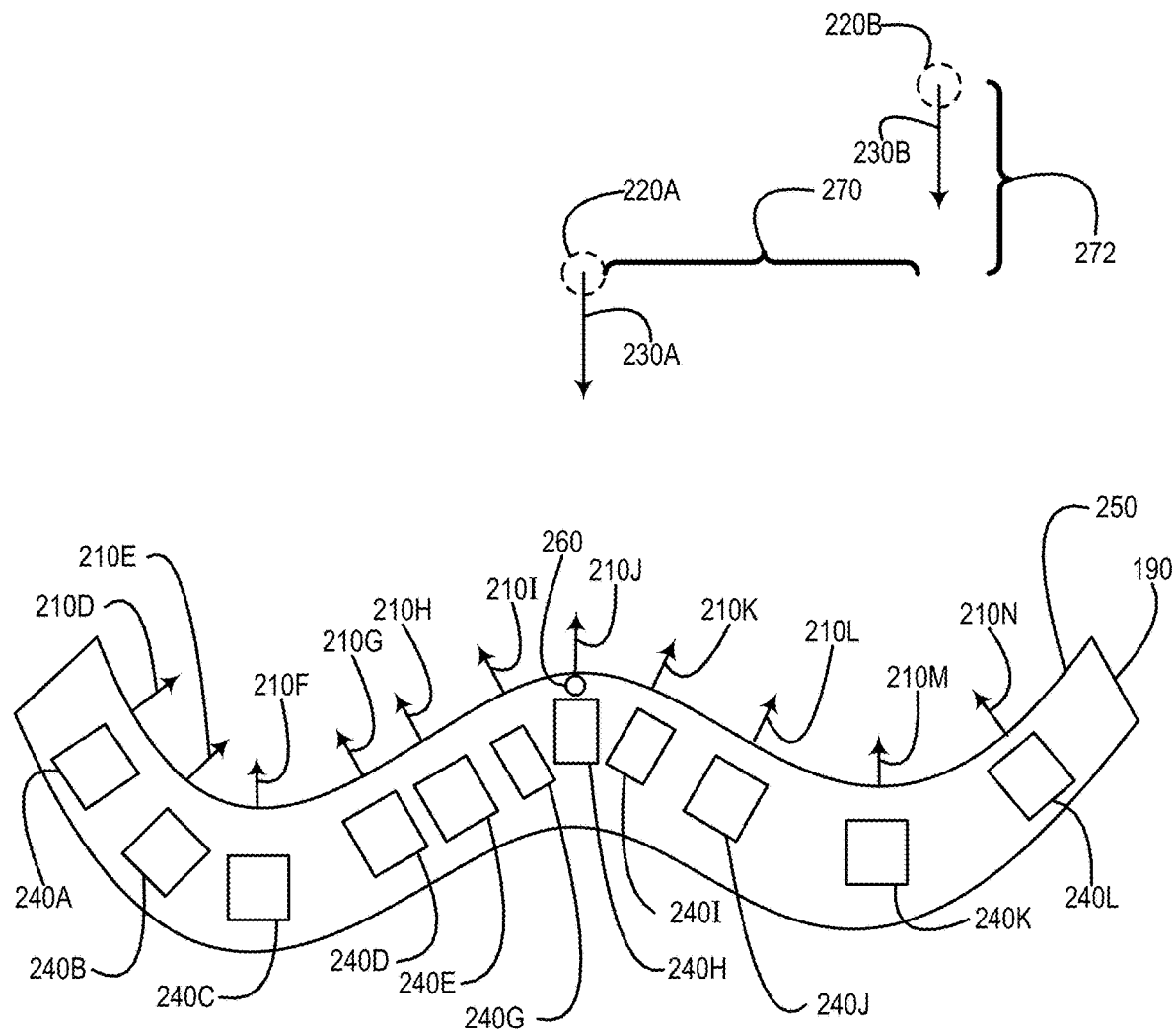
FIG. 2H illustrates a second example of a cross section of a curved display and observation points, according to one or more embodiments.

Turning now to FIG. 2H, a second example of a cross section of a curved display and observation points are illustrated, according to one or more embodiments. As shown, observation point 220B may be a distance 272 from observation point 220A. As illustrated, observation point 220B may be farther away from display 190 than observation point 220A. In one or more embodiments, one or more pixels of display 190 may appear different at observation point 220B than the one or more pixels of display 190 may appear at observation point 220A. For example, the one or more pixels of display 190 may appear different at observation point 220B than the one or more pixels of display 190 may appear at observation point 220A based at least on an angle with respect to position 260 of display 190.

Figure 2I:
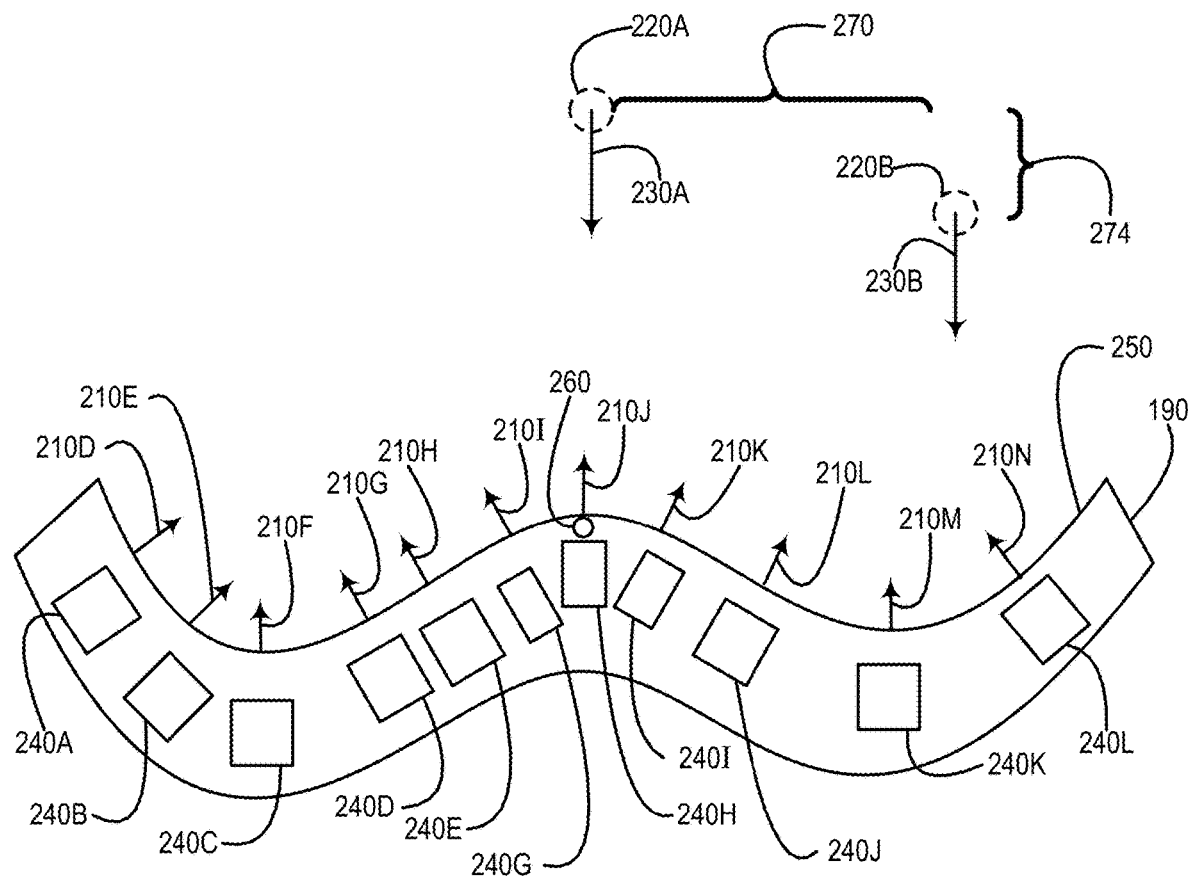
FIG. 2I illustrates another example of a cross section of a curved display and observation points, according to one or more embodiments.

Turning now to FIG. 2I, another example of a cross section of a curved display and observation points are illustrated, according to one or more embodiments. As shown, observation point 220B may be a distance 274 from observation point 220A. As illustrated, observation point 220B may be closer to display 190 than observation point 220A. In one or more embodiments, one or more pixels of display 190 may appear different at observation point 220B than the one or more pixels of display 190 may appear at observation point 220A. For example, the one or more pixels of display 190 may appear different at observation point 220B than the one or more pixels of display 190 may appear at observation point 220A based at least on an angle with respect to position 260 of display 190.

Figure 2J:
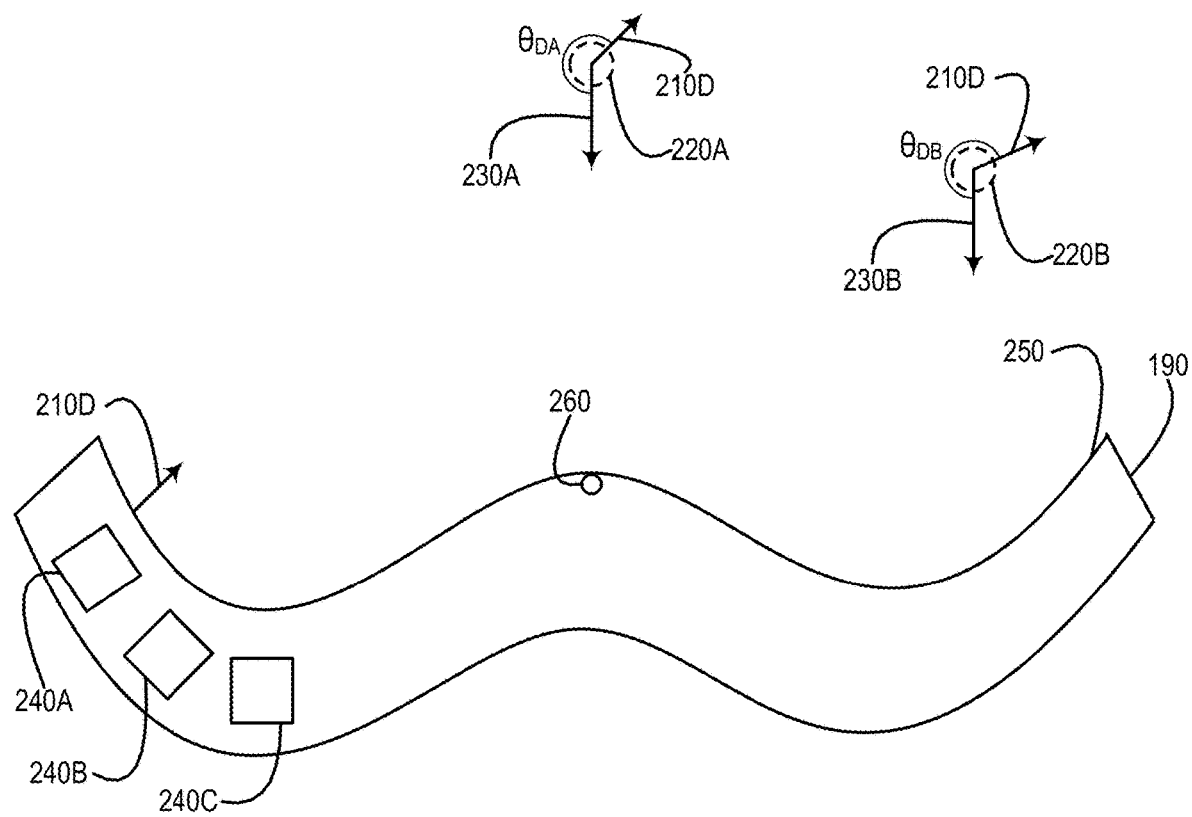
FIG. 2J illustrates an example of a cross section of a curved display, another observation point, and another angle of another first vector, according to one or more embodiments.

Turning now to FIG. 2J, an example of a cross section of a curved display, another observation point, and another angle of another first vector are illustrated, according to one or more embodiments. As shown, vector 210D may be at an angle $\theta_{DA}$ with respect to a vector 230A. In one or more embodiments, one or more pixels of display 190 may be adjusted based at least on angle $\theta_{DA}$ and/or vector 210D. For example, a luminous intensity of one or more pixels of display 190 may be adjusted based at least on angle $\theta_{DA}$ and/or vector 210D. For instance, the one or more pixels of display 190 that may be adjusted based at least on angle $\theta_{DA}$ and/or vector 210D may be proximate to a position of surface 250 where vector 210D is orthogonal to surface 250.

As illustrated, vector 210D may be at an angle $\theta_{DB}$ with respect to a vector 230B. In one or more embodiments, one or more pixels of display 190 may be adjusted based at least on angle $\theta_{DB}$ and/or vector 210D. For example, a luminous intensity of one or more pixels of display 190 may be adjusted based at least on angle $\theta_{DB}$ and/or vector 210D. For instance, the one or more pixels of display 190 that may be adjusted based at least on angle $\theta_{DB}$ and/or vector 210D may be proximate to a position of surface 250 where vector 210D is orthogonal to surface 250. In one or more embodiments, angle $\theta_{DB}$ may be associated with angle $\theta_{DA}$ may. In one example, angle $\theta_{DB}$ may be adjusted based at least on a distance from observation point 220A. In one instance, a distance from observation point 220A may be or include distance 270. In a second instance, a distance from observation point 220A may be or include distance 272. In another instance, a distance from observation point 220A may be or include distance 274. In another example, angle $\theta_{DB}$ may be adjusted based at least on a distance from position 260. In one instance, a distance from position 260 may be or include a distance left or right of position 260. In another instance, a distance from position 260 may be or include a distance closer to or farther from position 260.

Figure 2K:
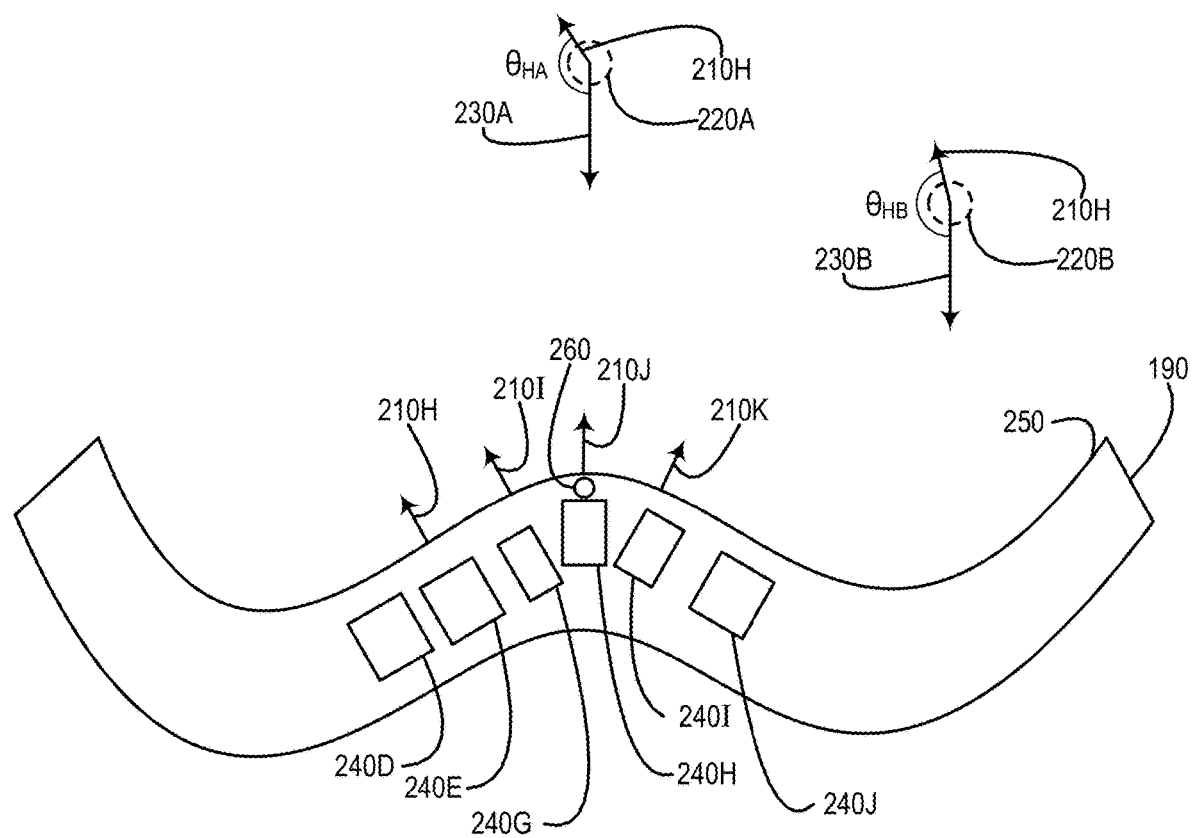
FIG. 2K illustrates an example of a cross section of a curved display, another observation point, and another angle of another second vector, according to one or more embodiments.

Turning now to FIG. 2K, an example of a cross section of a curved display, another observation point, and another angle of another second vector are illustrated, according to one or more embodiments. As shown, vector 210H may be at an angle $\theta_{HA}$ with respect to a vector 230A. In one or more embodiments, one or more pixels of display 190 may be adjusted based at least on angle $\theta_{HA}$ and/or vector 210H. For example, a luminous intensity of one or more pixels of display 190 may be adjusted based at least on angle $\theta_{HA}$ and/or vector 210H. For instance, the one or more pixels of display 190 that may be adjusted based at least on angle $\theta_{HA}$ and/or vector 210H may be proximate to a position of surface 250 where vector 210H is orthogonal to surface 250.

As illustrated, vector 210H may be at an angle $\theta_{HB}$ with respect to a vector 230B. In one or more embodiments, one or more pixels of display 190 may be adjusted based at least on angle $\theta_{HB}$ and/or vector 210H. For example, a luminous intensity of one or more pixels of display 190 may be adjusted based at least on angle $\theta_{HB}$ and/or vector 210H. For instance, the one or more pixels of display 190 that may be adjusted based at least on angle $\theta_{HB}$ and/or vector 210H may be proximate to a position of surface 250 where vector 210H is orthogonal to surface 250. In one or more embodiments, angle $\theta_{HB}$ may be associated with angle $\theta_{HA}$ may. In one example, angle $\theta_{HB}$ may be adjusted based at least on a distance from observation point 220A. In one instance, a distance from observation point 220A may be or include distance 270. In a second instance, a distance from observation point 220A may be or include distance 272. In another instance, a distance from observation point 220A may be or include distance 274. In another example, angle $\theta_{HB}$ may be adjusted based at least on a distance from position 260. In one instance, a distance from position 260 may be or include a distance left or right of position 260. In another instance, a distance from position 260 may be or include a distance closer to or farther from position 260.

Figure 2L:
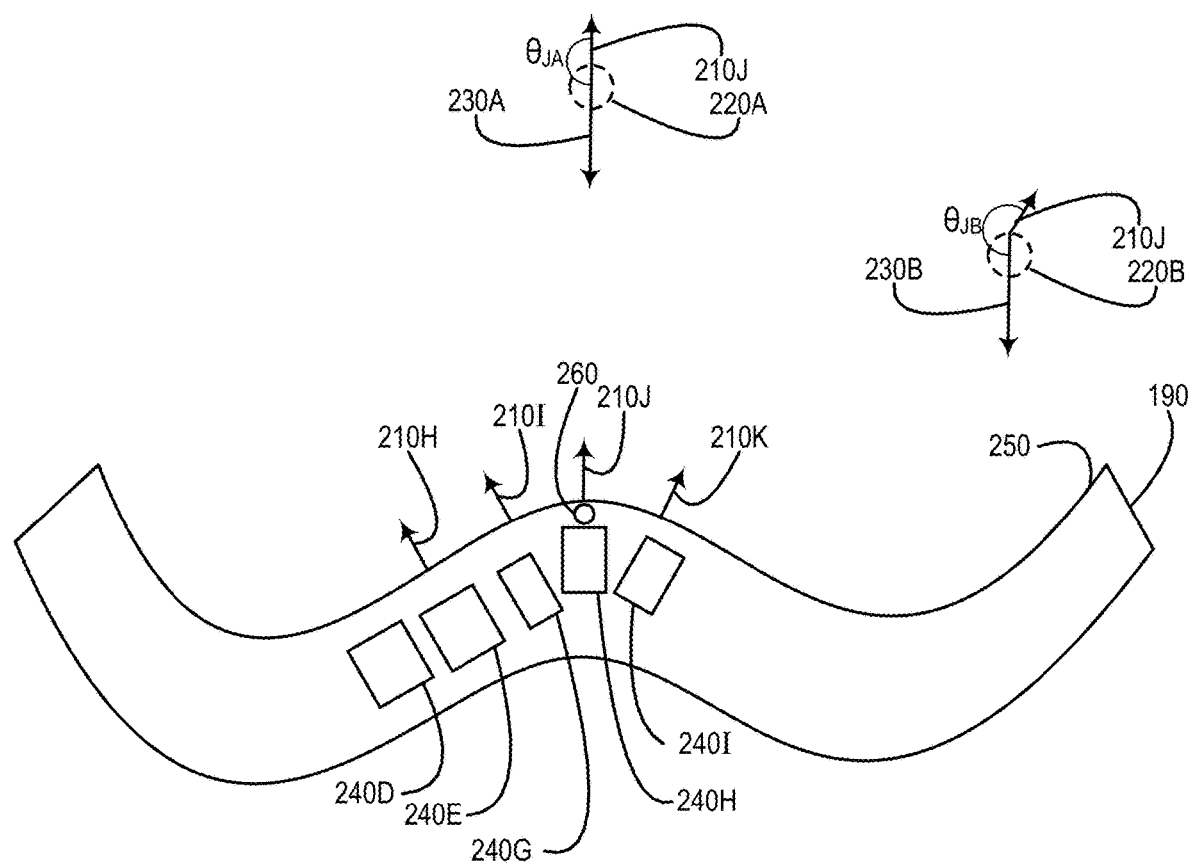
FIG. 2L illustrates an example of cross section of a curved display, another observation point, and another angle of another third vector, according to one or more embodiments.

Turning now to FIG. 2L, an example of cross section of a curved display, another observation point, and another angle of another third vector are illustrated, according to one or more embodiments. As shown, vector 210J may be at an angle $\theta_{JA}$ with respect to a vector 230A. In one or more embodiments, one or more pixels of display 190 may be adjusted based at least on angle $\theta_{JA}$ and/or vector 210J. For example, a luminous intensity of one or more pixels of display 190 may be adjusted based at least on angle $\theta_{JA}$ and/or vector 210J. For instance, the one or more pixels of display 190 that may be adjusted based at least on angle $\theta_{JA}$ and/or vector 210J may be proximate to a position of surface 250 where vector 210J is orthogonal to surface 250.

As illustrated, vector 210J may be at an angle $\theta_{JB}$ with respect to a vector 230B. In one or more embodiments, one or more pixels of display 190 may be adjusted based at least on angle $\theta_{JB}$ and/or vector 210J. For example, a luminous intensity of one or more pixels of display 190 may be adjusted based at least on angle $\theta_{JB}$ and/or vector 210J. For instance, the one or more pixels of display 190 that may be adjusted based at least on angle $\theta_{JB}$ and/or vector 210J may be proximate to a position of surface 250 where vector 210J is orthogonal to surface 250. In one or more embodiments, angle $\theta_{JB}$ may be associated with angle $\theta_{JA}$ may. In one example, angle $\theta_{JB}$ may be adjusted based at least on a distance from observation point 220A. In one instance, a distance from observation point 220A may be or include distance 270. In a second instance, a distance from observation point 220A may be or include distance 272. In another instance, a distance from observation point 220A may be or include distance 274. In another example, angle $\theta_{JB}$ may be adjusted based at least on a distance from position 260. In one instance, a distance from position 260 may be or include a distance left or right of position 260. In another instance, a distance from position 260 may be or include a distance closer to or farther from position 260.

Figure 2M:
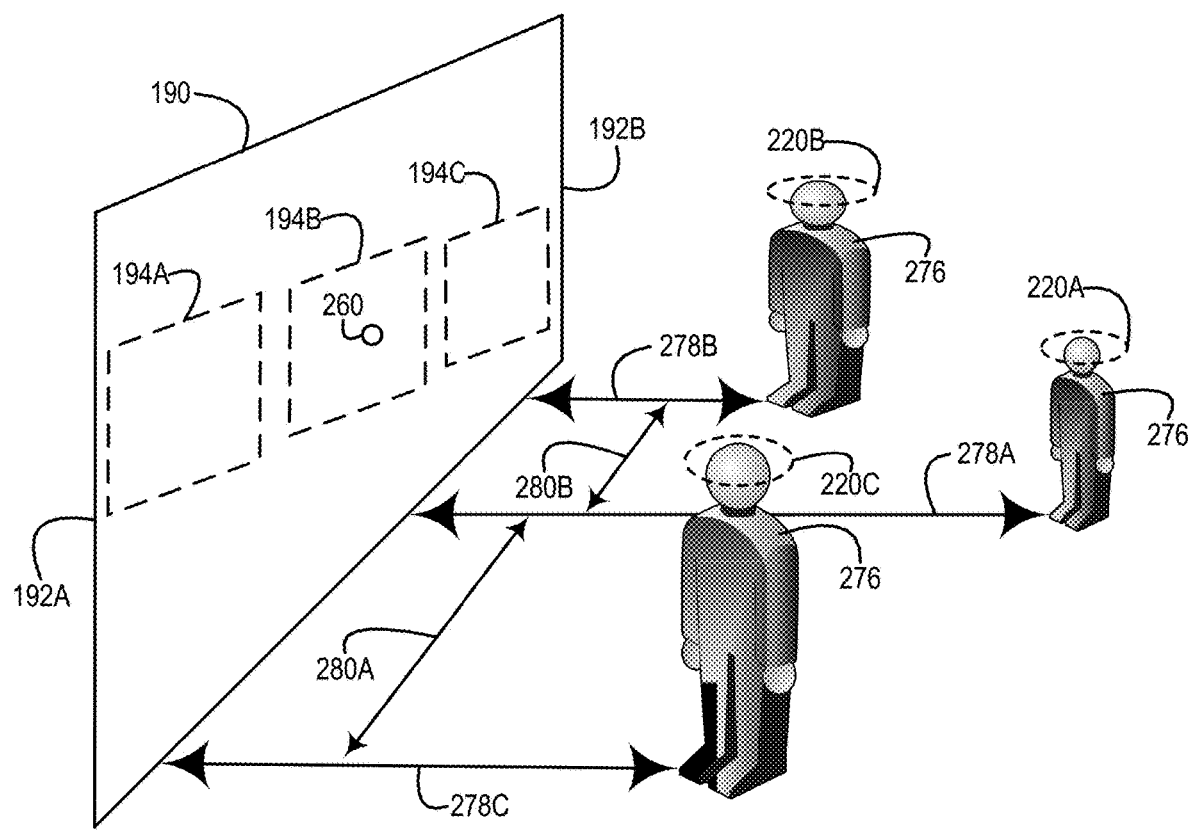
FIG. 2M illustrates examples of observation points associated with a display, according to one or more embodiments.

Turning now to FIG. 2M, an examples of observation points associated with a display are illustrated, according to one or more embodiments. As shown, a user (e.g., a person) 276 may be associated with observation points 220A-220C. As illustrated, observation points 220A-220C may be respective distances 278A-278C from display 190. As shown, observation point 220B may be a distance 280B right of position 260. As illustrated, observation point 220C may be a distance 280A left of position 260.

In one or more embodiments, one or more pixels of display 190 may be adjusted based at least on a distance of observation point 220 from display 190. In one example, one or more pixels of display 190 may be adjusted based at least on distance 278A of observation point 220A from display 190. For instance, a brightness associated with one or more pixels of display 190 may be increased based at least on distance 278A. In another example, one or more pixels of display 190 may be adjusted based at least on distance 278B of observation point 220B from display 190. For instance, a brightness associated with one or more pixels of display 190 may be decreased based at least on distance 278B.

In one or more embodiments, one or more pixels of display 190 may not be adjusted based at least on a distance of observation point 220 from display 190. For example, one or more pixels of display 190 may not be adjusted based at least on distance 278C of observation point 220C from display 190. For instance, a brightness associated with one or more pixels of display 190 may not be decreased or may not be increased based at least on distance 278C.

In one or more embodiments, one or more pixels of display 190 may be adjusted based at least on a distance from observation point 220 from position 260 of display 190. In one example, one or more pixels of display 190 may be adjusted based at least on distance 280B from observation point 220B from position 260. In one instance, one or more pixels of a display portion 194A of display 190 may be increased based at least on distance 280B from observation point 220B from position 260. In another instance, one or more pixels of display a portion 194B of display 190 may be increased based at least on distance 280B from observation point 220B from position 260. In another example, one or more pixels of display 190 may be adjusted based at least on distance 280A from observation point 220C from position 260. In one instance, one or more pixels of display portion 194B of display 190 may be increased based at least on distance 280B from observation point 220C from position 260. In another instance, one or more pixels of display a portion 194C of display 190 may be increased based at least on distance 280A from observation point 220C from position 260.

In one or more embodiments, one or more pixels of display 190 may be adjusted based at least on no distance from observation point 220 from position 260 of display 190. In one example, one or more pixels of display portion 194A of display 190 may be increased based at least on no distance from observation point 220A from position 260. In another example, one or more pixels of display portion 194C of display 190 may be increased based at least on no distance from observation point 220A from position 260.

Figure 2N:
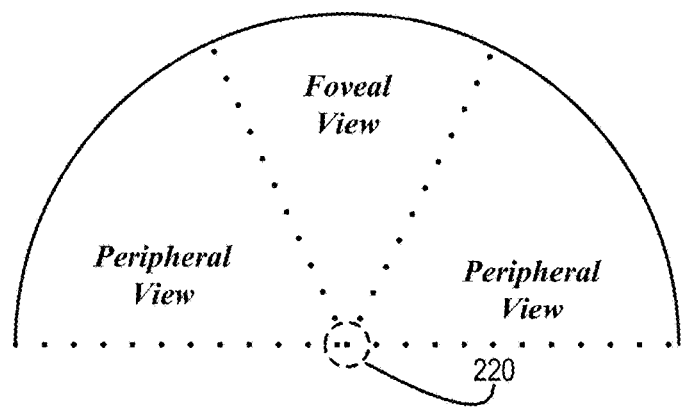
FIG. 2N illustrates examples foveal and peripheral views, according to one or more embodiments.

In one or more embodiments, adjusting one or more pixels of display 190 may be associated with foveal and/or peripheral views. For example, foveal and peripheral views are illustrated in FIG. 2N. In one or more embodiments, one or more pixels of display 190 associated with a peripheral view may be adjusted. For example, display portions 194A and 194C may be in a peripheral view from observation point 220A. In one instance, brightness of one or more pixels of display portions 194A and 194C may be increased as display portions 194A and 194C are within respective peripheral views from observation point 220A. In another instance, brightness of one or more pixels of display portions 194A and 194C may be decreased as display portions 194A and 194C are within respective peripheral views from observation point 220A.

Figure 2O:
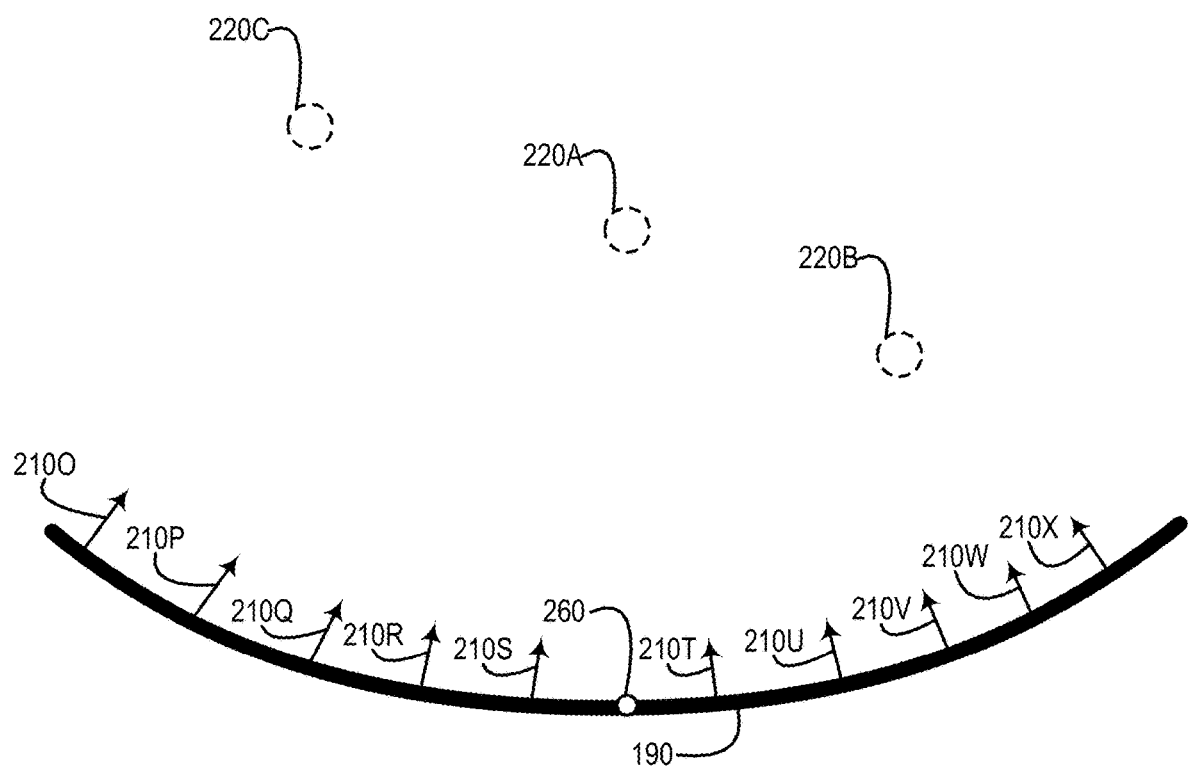
FIG. 2O illustrates another example of a curved display, according to one or more embodiments.

Turning now to FIG. 2O, another example of a curved display is illustrated, according to one or more embodiments. As shown, display 190 may be curved. In one or more embodiments, display 190 may be fixed to a curve. For example, a curve associated with display 190 may be known. For instance, determining angles of pixels of display 190 may not need to be determined via strain gauges. In one or more embodiments, a memory medium may include data associated with the curve associated with display 190. As illustrated, observation points 220B and 220C may be at respective distances from position 260 of display 190. As shown, observation points 220A-220C may be at respective distances from display 190.

Figure 2P:
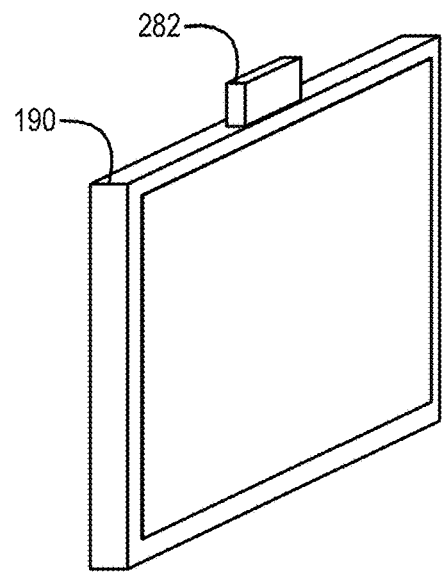
FIG. 2P illustrates an example of a tracking device, according to one or more embodiments.

Turning now to FIG. 2P, an example of a tracking device is illustrated, according to one or more embodiments. As shown, a tracking device 282 may be external to display 190. For example, tracking device 282 may be proximate to or in contact with display 190. In one or more embodiments, tracking device 282 may determine one or more positions of an observation point 220. For example, tracking device 282 may determine one or more positions of or more of observation points 220A-220C, among others. Although not specifically illustrated, tracking device 282 may be coupled to IHS 110, according to one or more embodiments. In one example, tracking device 282 may be coupled to processor 120. In another example, tracking device 282 may be coupled to GPU 185.

Figure 2Q:
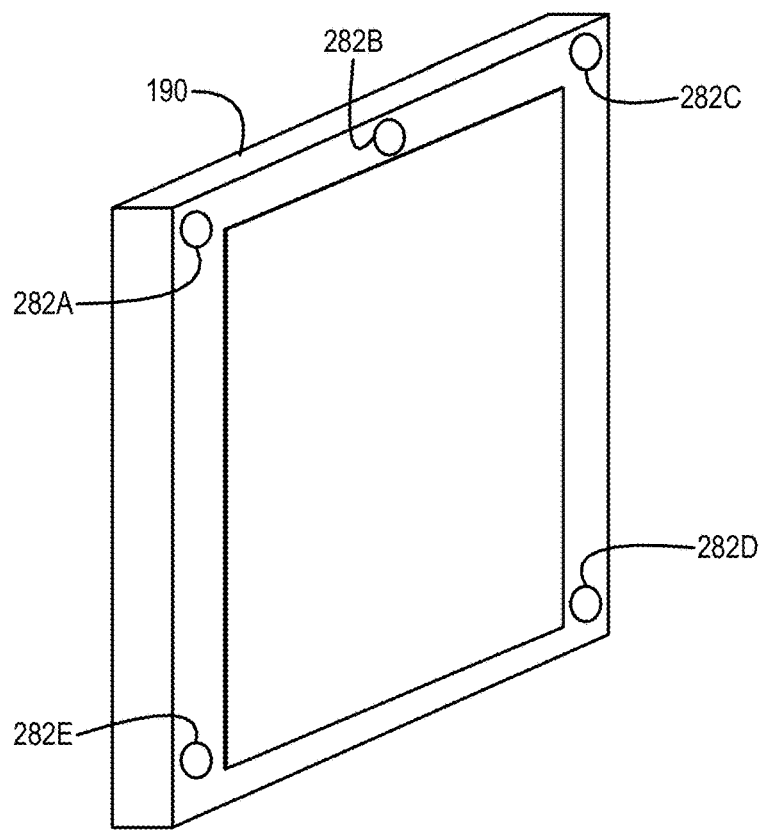
FIG. 2Q illustrates examples of tracking devices, according to one or more embodiments.

Turning now to FIG. 2Q, examples of tracking devices are illustrated, according to one or more embodiments. As shown, display 190 may include one or more of tracking devices 282A-282E. In one or more embodiments, display 190 may include a single tracking device. For example, display 190 may include tracking device 282B. In one or more embodiments, display 190 may include multiple tracking devices. For example, display 190 may include two or more of tracking devices 282A-282E.

Figure 2R:
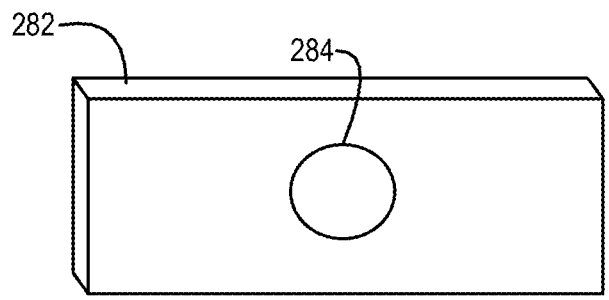
FIG. 2R illustrates a second example of a tracking device, according to one or more embodiments.

Turning now to FIG. 2R, a second example of a tracking device is illustrated, according to one or more embodiments. As shown, tracking device 282 may include an image sensor 284. In one or more embodiments, image sensor 284 may be or include a camera.

Figure 2S:
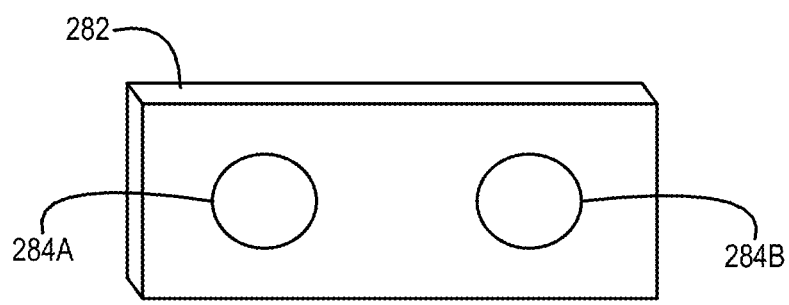
FIG. 2S illustrates a third example of a tracking device, according to one or more embodiments.

Turning now to FIG. 2S, a third example of a tracking device is illustrated, according to one or more embodiments. As shown, tracking device 282 may include image sensors 284A and 284B. In one or more embodiments, image sensor 284 may be or include a camera.

Figure 2T:
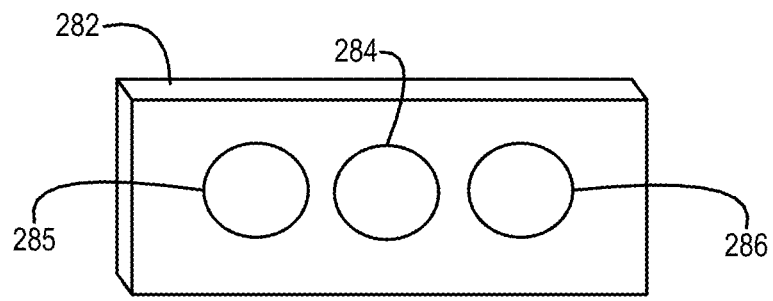
FIG. 2T illustrates another example of a tracking device, according to one or more embodiments.

Turning now to FIG. 2T, another example of a tracking device is illustrated, according to one or more embodiments. As shown, tracking device 282 may include an image sensor 284. In one or more embodiments, image sensor 284 may be or include a camera. As illustrated, tracking device 282 may include depth sensors 285 and 286. In one or more embodiments, one or more of depth sensors 285 and 286 may include one more of an optical sensor and a projector (e.g., an infrared projector), among others. In one or more embodiments, two or more of depth sensors 285 and 286 and image sensor 284 may be combined.

In one or more embodiments, one or more of depth sensors 285 and 286 may include a sound producing device and a sound receiving device. In one example, the sound producing device may include a speaker. In another example, the sound receiving device may include microphone. In one or more embodiments, the sound producing device and the sound receiving device may include, form, and/or implement a sonar device. In one or more embodiments, the sound producing device and the sound receiving device may be combined. For example, the sound producing device and the sound receiving device may include, form, and/or implement a transducer.

Figure 3A:
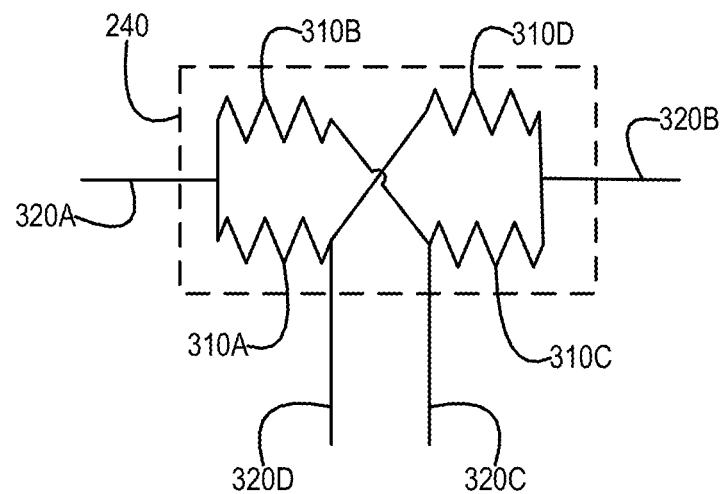
FIG. 3A illustrates an example of a strain gauge, according to one or more embodiments.

Turning now to FIG. 3A, an example of a strain gauge is illustrated, according to one or more embodiments. As shown, strain gauge 240 may include resistive elements 310A-310D. As illustrated, resistive elements 310A and 310B may be coupled together and/or may be coupled to a conductor 320A. As shown, resistive elements 310C and 310D may be coupled together and/or may be coupled to a conductor 320B. As illustrated, resistive elements 310B and 310C may be coupled together and/or may be coupled to a conductor 320C. As shown, resistive elements 310A and 310D may be coupled together and/or may be coupled to a conductor 320D.

Figure 3B:
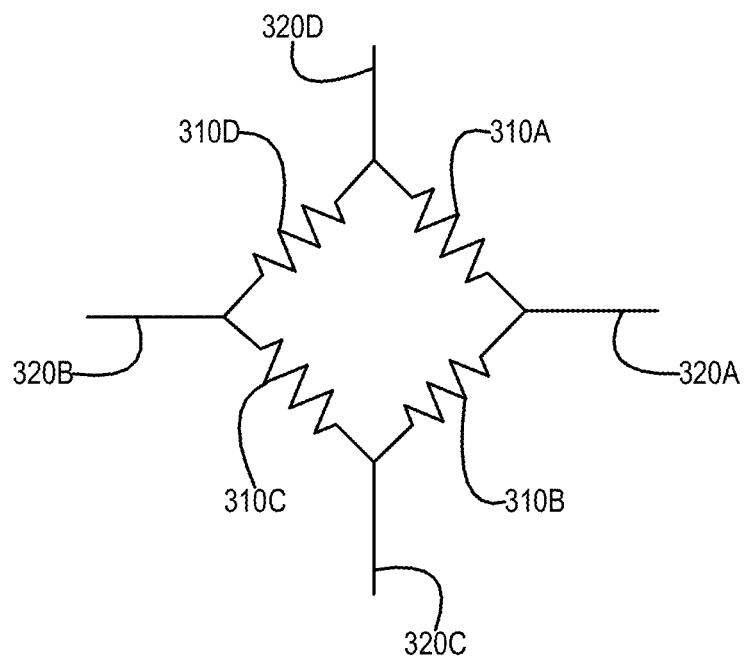
FIG. 3B illustrates an example of resistive elements graphically arranged as a Wheatstone Bridge, according to one or more embodiments.

In one or more embodiments, a voltage source may be applied to strain gauge 240, and a voltage reading may be obtained from strain gauge 240. In one example, a voltage source may be applied to conductors 320A and 320B. In another example, a voltage reading may be obtained from conductors 320C and 320D. In one or more embodiments, a voltage from strain gauge 240 may be converted into digital data. For example, an analog to digital conversion (ADC) system, method, and/or process may convert an analog voltage from strain gauge 240 into digital data. For instance, IHS 110 may include ADC circuitry that may convert one or more analog signals into digital data. In one or more embodiments, resistive elements 310A-310D may be arranged as a Wheatstone Bridge. For example, FIG. 3B illustrates resistive elements 310A-310D graphically arranged as a Wheatstone Bridge.

Figure 3C:
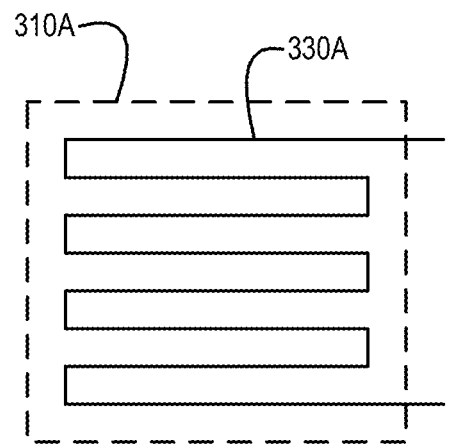
FIG. 3C illustrates examples of a strain gauge in various states, according to one or more embodiments.
Figure 3C:
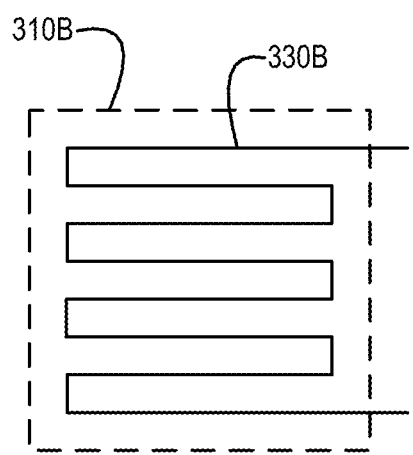
Figure 3C:
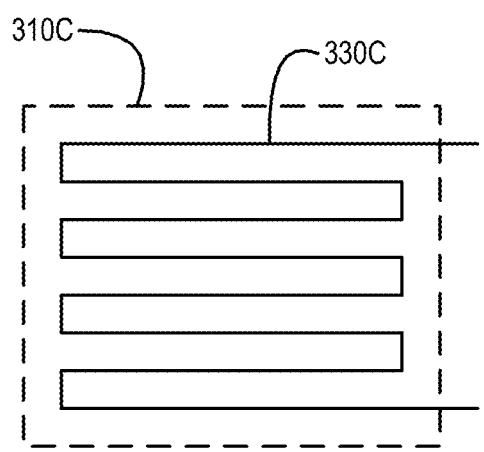

Turning now to FIG. 3C, examples of a strain gauge in various states are illustrated, according to one or more embodiments. As shown, resistive elements 310A-310C may include respective resistive elements 330A-330C. In one or more embodiments, resistive element 330 may be or include a conductor. For example, resistive element 330 may be or include a conductor that is not a perfect conductor. For instance, a conductor that is not a perfect conductor may have one or more resistances associated with it. As illustrated, resistive element 310A may not be in compression or in tension. For example, resistive element 310A may be associated with a first resistance. As shown, resistive element 310B may be in compression. For example, resistive element 310B may be associated with a second resistance, different from the first resistance. As illustrated, resistive element 310C may be in tension. For example, resistive element 310C may be associated with a third resistance, different from the first resistance and different from the second resistance.

Figure 4:
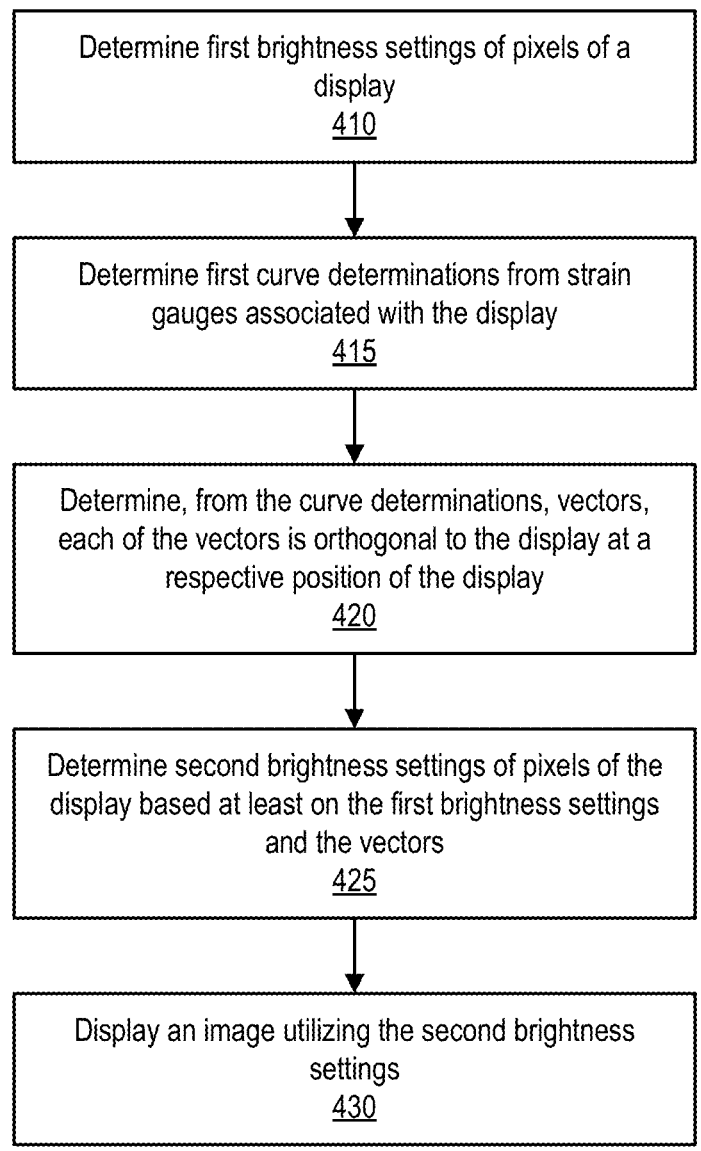
FIG. 4 illustrates an example of a method of displaying information via a curved display, according to one or more embodiments.

Turning now to FIG. 4, an example of a method of displaying information via a curved display is illustrated, according to one or more embodiments. At 410, first brightness settings of pixels of a display may be determined. For example, the first brightness settings of pixels of display 190 may be associated with an image. For instance, a pixel may produce light that may represent a portion of the image. In one or more embodiments, the light produced by the pixel may include one or more of a brightness and a color, among others.

At 415, curve determinations may be determined from strain gauges associated with the display. For example, curve determinations of surface 250 may be determined utilizing two or more of strain gauges 240A-240L. At 420, vectors may be determined from the curve determinations, each of the vectors is orthogonal to the display at a respective position of the display. For example, two or more of vectors 210D-210N may be determined. At 425, second brightness settings of pixels of the display may be determined based at least on the first brightness settings and the vectors. For example, second brightness settings of pixels of the display may be determined based at least on the first brightness settings and two or more of vectors 210D-210N.

In one or more embodiments, determining the second brightness settings may include adjusting the first brightness settings. For example, a brightness setting of the first brightness settings may be adjusted based at least on an associated vector of the vectors. In one instance, a first brightness setting of the first brightness settings may be adjusted based at least on vector 210G, which may produce a first brightness setting of the second brightness settings. In another instance, a second brightness setting of the first brightness settings may be adjusted based at least on vector 210L, which may produce a second brightness setting of the second brightness settings.

In one or more embodiments, adjusting a brightness setting may include determining a new brightness setting based at least on an associated vector. For example, determining the new brightness setting may be based at least on an angle of the associated vector with an observation point. For instance, an angle of associated vector 210 may be with respect to vector 230. In one or more embodiments, determining the new brightness setting based at least on an angle of the associated vector with the observation point may include determining a dot product or an inner product of vector 210 vector 230. In one example, the dot product or the inner product may be utilized in determining the new brightness setting. In another example, an inverse cosine of the dot product or the inner product may be utilized in determining the new brightness setting. For instance, an inverse cosine of the dot product or the inner product of vectors 210 and 230 may be utilized in determining an angle between vectors 210 and 230.

Figure 5:
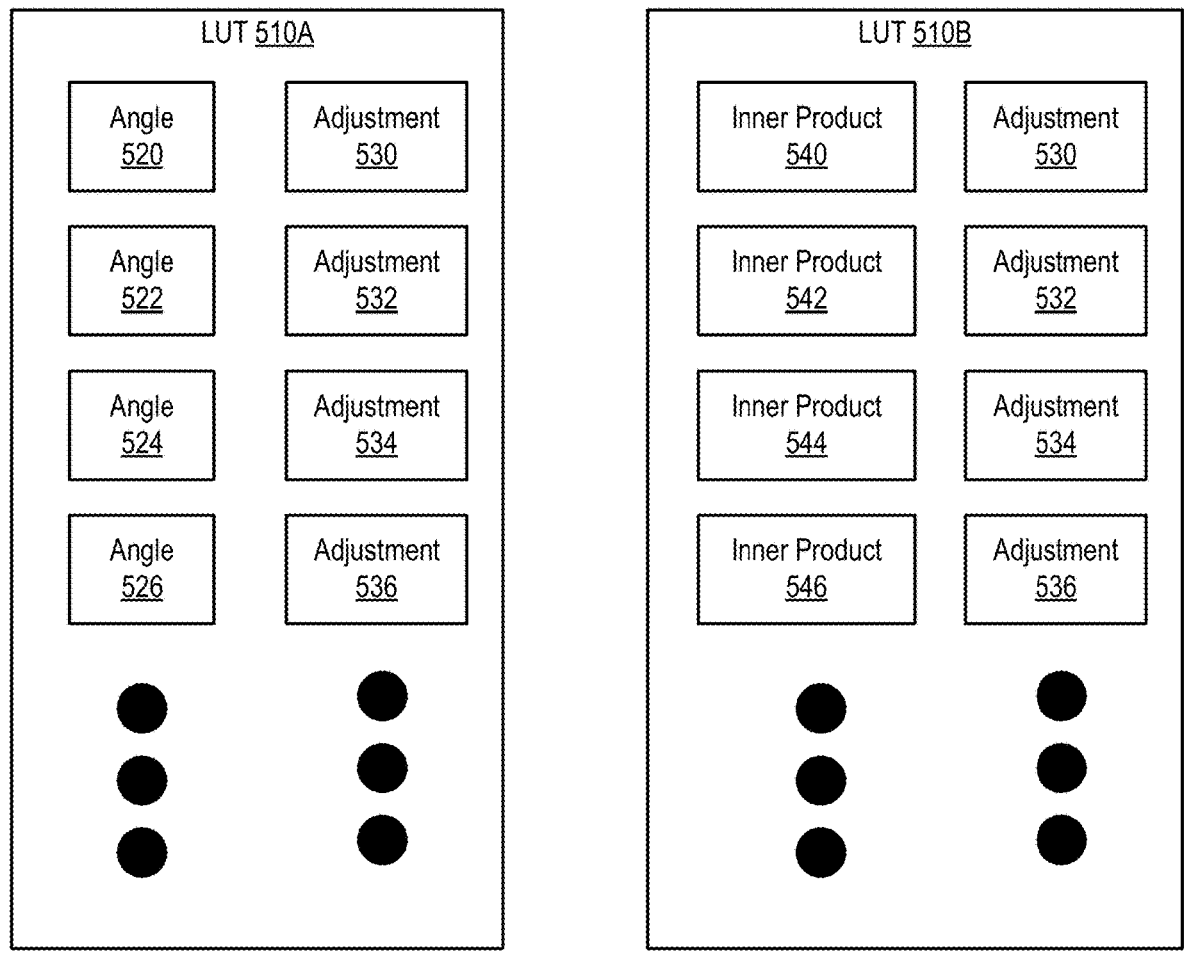
FIG. 5 illustrates example of lookup tables, according to one or more embodiments.

In one or more embodiments, determining the new brightness setting based at least on the angle of the associated vector with the observation point may include utilizing a lookup table (LUT). In one example, the LUT may be accessed based at least on the angle between vectors 210 and 230 to determine an adjustment value to utilize with the brightness setting to determine the new brightness setting. For instance, the LUT may be or include a LUT 510A, illustrated in FIG. 5, and adjustments 530-536 (e.g., adjustment values) may be associated with respective angles 520-526. In another example, the LUT may be accessed based at least on the dot product or the inner product of vectors 210 and 230 to determine an adjustment value to utilize with the brightness setting to determine the new brightness setting. For instance, the LUT may be or include a LUT 510B, illustrated in FIG. 5, and adjustments 530-536 (e.g., adjustment values) may be associated with respective inner products (e.g., dot products) 540-546.

In one or more embodiments, a LUT may include precomputed values of a function or a mapping over a set of inputs. For example, the function or the mapping may be computationally expensive, and the precomputed values of the function or the mapping over the set of inputs may be cached. For instance, table lookups may be performed faster than computing the values from of the function each time a value from the function is requested. In one or more embodiments, the LUT may be a single dimensional LUT or a multiple dimensional LUT. In one or more embodiments, a value of the function or the mapping from an input that is not included in the LUT may be computed from an interpolation process and/or method that may generate reasonable approximations from inputs of the LUT. For example, the interpolation process and/or method that may generate reasonable approximations from nearby inputs. For instance, the interpolation process and/or method that may generate reasonable approximations by averaging values of the function or the mapping from inputs that are close to and/or nearby the input that does not correspond to a function or mapping value.

In one or more embodiments, an interpolation process and/or method may generate values for inputs that are within bounds of the inputs of a LUT but do not correspond to the inputs of a LUT. For example, the interpolation process and/or method may generate a value for an input between two of the inputs of the LUT. In one instance, the interpolation process and/or method may return a nearest table entry (e.g., a value for a requested input, where the value corresponds to an input of the LUT that is nearest the requested input). In a second instance, the interpolation process and/or method may compute a weighted average between or among two or more bounding inputs of the LUT, based at least on a relative distance of the requested input to neighboring inputs of the LUT (e.g., linear interpolation). In a third instance, the interpolation process and/or method may compute a value between or among two or more bounding inputs of the LUT, based at least on the two or more bounding inputs being within a threshold measure of the input value. In another instance, the interpolation process and/or method may compute a curve fit between or among two or more bounding inputs of the LUT and output values of the two or more bounding inputs.

In one or more embodiments, a GPU (e.g., GPU 185) may access a LUT that includes brightness adjustments (e.g., brightness adjustment values). In one example, the GPU may lookup adjustments (e.g., adjustment values) to the first settings based at least on angles of the vectors with respect to the observation point. For instance, the GPU may lookup adjustment values, from the LUT, to the first settings based at least on angles of the vectors 210 with respect to vector 230. In another example, the GPU may lookup adjustments (e.g., adjustment values) to the first settings based at least on dot products or inner products of the vectors with respect to the observation point. For instance, the GPU may lookup adjustment values, from the LUT, to the first settings based at least on dot products or inner products of vectors 210 with respect to vector 230.

In one or more embodiments, the GPU may adjust the first brightness settings from adjustments (e.g., adjustment values) of the LUT. For example, the GPU may compute a brightness setting of the second brightness setting from a brightness setting associated with a pixel, associated with vector 210, and an adjustment value associated with vector 210. In one instance, GPU 185 may compute a first brightness setting, associated with vector 210G, of the second brightness settings utilizing a first brightness setting, associated with vector 210G, of the first brightness settings and a dot product (or inner product) of vectors 210G and 230 or an angle between vectors 210G and 230. In another instance, GPU 185 may compute a second brightness setting, associated with vector 210L, of the second brightness settings utilizing a second brightness setting, associated with vector 210L, of the first brightness settings and a dot product (or inner product) of vectors 210L and 230 or an angle between vectors 210L and 230.

In one or more embodiments, determining the first brightness adjustment of the first brightness adjustments may include determining if a first angle associated with a first vector of the vectors is in the angles of LUT 510A. If the first angle associated with the first vector of the vectors is in the angles of LUT 510A, a brightness adjustment of the brightness adjustments associated with the first angle associated with the first vector of the vectors may be retrieved. If the first angle associated with the first vector of the vectors is not in the angles of LUT 510A, a brightness adjustment based on at least two brightness adjustments of the brightness adjustments associated with at least two respective angles of the angles of LUT 510A may be interpolated. For example, the at least two respective angles of the angles of LUT 510A may be within a threshold measure of the first angle associated with the first vector of the vectors. In one or more embodiments, interpolating the brightness adjustment may include fitting a curve to the at least two brightness adjustments of the brightness adjustments associated with the at least two respective angles of the angles of LUT 510A.

In one or more embodiments, determining the first brightness adjustment of the first brightness adjustments may include determining if a first inner product associated with a first vector of the vectors is in the inner products of LUT 510B. If the first inner product associated with the first vector of the vectors is in the inner products of LUT 510B, a brightness adjustment of the brightness adjustments associated with the first inner product associated with the first vector of the vectors may be retrieved. If the first inner product associated with the first vector of the vectors is not in the inner products of LUT 510B, a brightness adjustment based on at least two brightness adjustments of the brightness adjustments associated with at least two respective inner products of the inner products of LUT 510B may be interpolated. For example, the at least two respective inner products of the inner products of LUT 510B may be within a threshold measure of the first inner product associated with the first vector of the vectors. In one or more embodiments, interpolating the brightness adjustment may include fitting a curve to the at least two brightness adjustments of the brightness adjustments associated with the at least two respective inner products of the inner products of LUT 510B.

At 430, the display may display an image utilizing the second plurality of brightness settings. For example, display 190 may display an image utilizing the second plurality of brightness settings.

Figure 6:
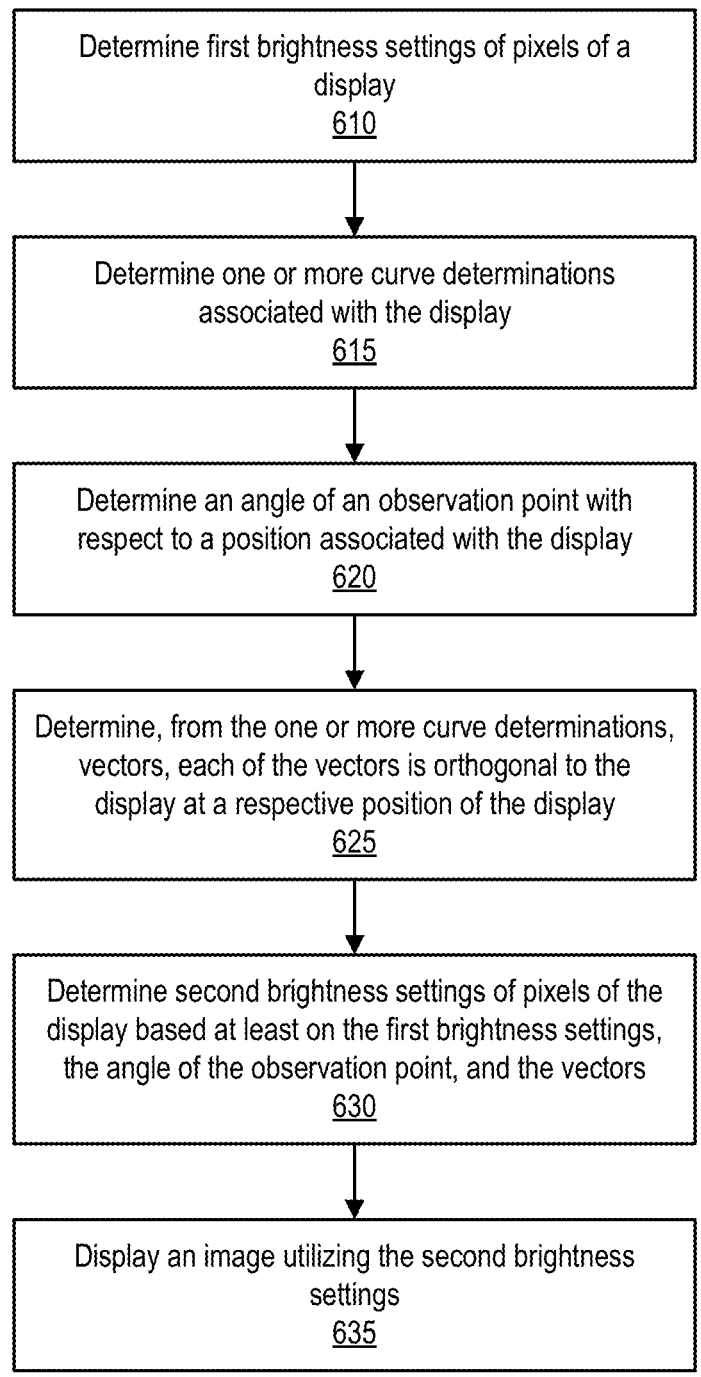
FIG. 6 illustrates another example of a method of displaying information via a curved display, according to one or more embodiments.

Turning now to FIG. 6, another example of a method of displaying information via a curved display is illustrated, according to one or more embodiments. At 610, first brightness settings of pixels of a display may be determined. For example, the first brightness settings of pixels of display 190 may be associated with an image. For instance, a pixel may produce light that may represent a portion of the image. In one or more embodiments, the light produced by the pixel may include one or more of a brightness and a color, among others.

At 615, one or more curve determinations associated with the display may be determined. In one example, one or more curve determinations associated with the display may be determined from strain gauges associated with the display. For instance, one or more curve determinations of surface 250 may be determined utilizing two or more of strain gauges 240A-240L. In another example, a curve determination associated with the display may be determined may be determined via a memory medium. For instance, a curve associated with display 190 (e.g., illustrated in FIG. 2O) may be determined may be determined via a memory medium. In one or more embodiments, determining a curve associated with display 190 may include accessing a memory medium and retrieving, from the memory medium, information associated with the curve associated with display 190. In one or more embodiments, determining a curve associated with display 190 may include receiving, from display 190, information associated with the curve associated with display 190. For example, display 190 may provide information associated with the curve associated with display 190.

At 620, an angle of an observation point with respect to a position associated with the display may be determined. For example, an angle with respect to position 260 associated with display 190 may be determined. In one instance, an angle with respect to position 260 may be based at least on a distance from position 260 or may be based at least on a distance from display 190. In another instance, an angle with respect to position 260 may be based at least on a distance left of or right of position 260.

In one or more embodiments, determining an angle of an observation point with respect to a position associated with the display may include receiving information from a tracking device. For example, IHS 110 may receive information from tracking device 282. In one instance, the information from tracking device 282 may include an angle of observation point 220 with respect to position 260 associated with display 190. In another instance, the information from tracking device 282 may include data which may be utilized to determine an angle of observation point 220 with respect to position 260 associated with display 190. In one or more embodiments, tracking device 282 may track observation point 220. For example, tracking device 282 may continually track observation point 220. For instance, tracking device 282 may periodically provide, to IHS 110, information that may include an angle of observation point 220 with respect to position 260 associated with display 190 or information that may include data which may be utilized to determine an angle of observation point 220 with respect to position 260 associated with display 190.

At 625, vectors may be determined from the one or more curve determinations, each of the vectors is orthogonal to the display at a respective position of the display. In one example, two or more of vectors 210D-210N may be determined. In another example, two or more of vectors 210O-210X may be determined. At 630, second brightness settings of pixels of the display may be determined based at least on the first brightness settings, the angle of the observation point with respect to the position associated with the display, and the vectors. In one example, second brightness settings of pixels of the display may be determined based at least on the first brightness settings, the angle of the observation point with respect to the position associated with the display, and two or more of vectors 210D-210N. In another example, second brightness settings of pixels of the display may be determined based at least on the first brightness settings, the angle of the observation point with respect to the position associated with the display, and two or more of vectors 210O-210X.

In one or more embodiments, determining the second brightness settings may include adjusting the first brightness settings. For example, a brightness setting of the first brightness settings may be adjusted based at least on an associated vector of the vectors. In one instance, a first brightness setting of the first brightness settings may be adjusted based at least on vector 210G, which may produce a first brightness setting of the second brightness settings. In a second instance, a second brightness setting of the first brightness settings may be adjusted based at least on vector 210L, which may produce a second brightness setting of the second brightness settings. In third instance, a first brightness setting of the first brightness settings may be adjusted based at least on vector 210Q, which may produce a first brightness setting of the second brightness settings. In another instance, a second brightness setting of the first brightness settings may be adjusted based at least on vector 210T, which may produce a second brightness setting of the second brightness settings.

In one or more embodiments, adjusting a brightness setting may include determining a new brightness setting based at least on an associated vector. For example, determining the new brightness setting may be based at least on an angle of the associated vector with an observation point. For instance, an angle of associated vector 210 may be with respect to vector 230B. In one or more embodiments, determining the new brightness setting based at least on an angle of the associated vector with the observation point may include determining a dot product or an inner product of vector 210 vector 230B. In one example, the dot product or the inner product may be utilized in determining the new brightness setting. In another example, an inverse cosine of the dot product or the inner product may be utilized in determining the new brightness setting. For instance, an inverse cosine of the dot product or the inner product of vectors 210 and 230B may be utilized in determining an angle between vectors 210 and 230B.

In one or more embodiments, determining the new brightness setting based at least on the angle of the associated vector with the observation point may include utilizing a lookup table (LUT). In one example, the LUT may be accessed based at least on the angle between vectors 210 and 230B to determine an adjustment value to utilize with the brightness setting to determine the new brightness setting. For instance, the LUT may be or include a LUT 510A, illustrated in FIG. 5, and adjustments 530-536 (e.g., adjustment values) may be associated with respective angles 520-526. In another example, the LUT may be accessed based at least on the dot product or the inner product of vectors 210 and 230B to determine an adjustment value to utilize with the brightness setting to determine the new brightness setting. For instance, the LUT may be or include a LUT 510B, illustrated in FIG. 5, and adjustments 530-536 (e.g., adjustment values) may be associated with respective inner products (e.g., dot products) 540-546.

In one or more embodiments, a LUT may include precomputed values of a function or a mapping over a set of inputs. For example, the function or the mapping may be computationally expensive, and the precomputed values of the function or the mapping over the set of inputs may be cached. For instance, table lookups may be performed faster than computing the values from of the function each time a value from the function is requested. In one or more embodiments, the LUT may be a single dimensional LUT or a multiple dimensional LUT. In one or more embodiments, a value of the function or the mapping from an input that is not included in the LUT may be computed from an interpolation process and/or method that may generate reasonable approximations from inputs of the LUT. For example, the interpolation process and/or method that may generate reasonable approximations from nearby inputs. For instance, the interpolation process and/or method that may generate reasonable approximations by averaging values of the function or the mapping from inputs that are close to and/or nearby the input that does not correspond to a function or mapping value.

In one or more embodiments, an interpolation process and/or method may generate values for inputs that are within bounds of the inputs of a LUT but do not correspond to the inputs of a LUT. For example, the interpolation process and/or method may generate a value for an input between two of the inputs of the LUT. In one instance, the interpolation process and/or method may return a nearest table entry (e.g., a value for a requested input, where the value corresponds to an input of the LUT that is nearest the requested input). In a second instance, the interpolation process and/or method may compute a weighted average between or among two or more bounding inputs of the LUT, based at least on a relative distance of the requested input to neighboring inputs of the LUT (e.g., linear interpolation). In a third instance, the interpolation process and/or method may compute a value between or among two or more bounding inputs of the LUT, based at least on the two or more bounding inputs being within a threshold measure of the input value. In another instance, the interpolation process and/or method may compute a curve fit between or among two or more bounding inputs of the LUT and output values of the two or more bounding inputs.

In one or more embodiments, a GPU (e.g., GPU 185) may access a LUT that includes brightness adjustments (e.g., brightness adjustment values). In one example, the GPU may lookup adjustments (e.g., adjustment values) to the first settings based at least on angles of the vectors with respect to the observation point. For instance, the GPU may lookup adjustment values, from the LUT, to the first settings based at least on angles of the vectors 210 with respect to vector 230B. In another example, the GPU may lookup adjustments (e.g., adjustment values) to the first settings based at least on dot products or inner products of the vectors with respect to the observation point. For instance, the GPU may lookup adjustment values, from the LUT, to the first settings based at least on dot products or inner products of vectors 210 with respect to vector 230B.

In one or more embodiments, the GPU may adjust the first brightness settings from adjustments (e.g., adjustment values) of the LUT. For example, the GPU may compute a brightness setting of the second brightness setting from a brightness setting associated with a pixel, associated with vector 210, and an adjustment value associated with vector 210. In one instance, GPU 185 may compute a first brightness setting, associated with vector 210G, of the second brightness settings utilizing a first brightness setting, associated with vector 210G, of the first brightness settings and a dot product (or inner product) of vectors 210G and 230B or an angle between vectors 210G and 230B. In a second instance, GPU 185 may compute a second brightness setting, associated with vector 210L, of the second brightness settings utilizing a second brightness setting, associated with vector 210L, of the first brightness settings and a dot product (or inner product) of vectors 210L and 230B or an angle between vectors 210L and 230B. In another instance, GPU 185 may compute a second brightness setting, associated with vector 210Q, of the second brightness settings utilizing a second brightness setting, associated with vector 210Q, of the first brightness settings and a dot product (or inner product) of vectors 210Q and 230B or an angle between vectors 210Q and 230B.

In one or more embodiments, determining the first brightness adjustment of the first brightness adjustments may include determining if a first angle associated with a first vector of the vectors is in the angles of LUT 510A. If the first angle associated with the first vector of the vectors is in the angles of LUT 510A, a brightness adjustment of the brightness adjustments associated with the first angle associated with the first vector of the vectors may be retrieved. If the first angle associated with the first vector of the vectors is not in the angles of LUT 510A, a brightness adjustment based on at least two brightness adjustments of the brightness adjustments associated with at least two respective angles of the angles of LUT 510A may be interpolated. For example, the at least two respective angles of the angles of LUT 510A may be within a threshold measure of the first angle associated with the first vector of the vectors. In one or more embodiments, interpolating the brightness adjustment may include fitting a curve to the at least two brightness adjustments of the brightness adjustments associated with the at least two respective angles of the angles of LUT 510A.

In one or more embodiments, determining the first brightness adjustment of the first brightness adjustments may include determining if a first inner product associated with a first vector of the vectors is in the inner products of LUT 510B. If the first inner product associated with the first vector of the vectors is in the inner products of LUT 510B, a brightness adjustment of the brightness adjustments associated with the first inner product associated with the first vector of the vectors may be retrieved. If the first inner product associated with the first vector of the vectors is not in the inner products of LUT 510B, a brightness adjustment based on at least two brightness adjustments of the brightness adjustments associated with at least two respective inner products of the inner products of LUT 510B may be interpolated. For example, the at least two respective inner products of the inner products of LUT 510B may be within a threshold measure of the first inner product associated with the first vector of the vectors. In one or more embodiments, interpolating the brightness adjustment may include fitting a curve to the at least two brightness adjustments of the brightness adjustments associated with the at least two respective inner products of the inner products of LUT 510B.

At 635, the display may display an image utilizing the second plurality of brightness settings. For example, display 190 may display an image utilizing the second plurality of brightness settings.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor;
a memory medium, coupled to the at least one processor, that stores instructions executable by the at least one processor, which when executed by the at least one processor, cause the information handling system to:
determine a first plurality of brightness settings of pixels of a display based on a first observation point; and
determine one or more of an angle and a distance associated with a second observation point with respect to the first observation point;
determine a second plurality of brightness settings of the pixels of the display based at least on the first plurality of brightness settings and the one or more of the angle and the distance associated with the second observation point; and
wherein the instructions further cause the information handling system to:
display, via the display, an image utilizing the second plurality of brightness settings.

2. The information handling system of claim 1, wherein the instructions further cause the information handling system to receive information from a tracking device; and
wherein, to determine the one or more of the angle and the distance associated with the second observation point with respect to the first observation point, the instructions further cause the information handling system to determine the one or more of the angle and the distance associated with the second observation point with respect to the first observation point based at least on the information from the tracking device.

3. The information handling system of claim 2, wherein the tracking device includes one or more image sensors.

4. The information handling system of claim 1, wherein the display has one or more curves.

5. The information handling system of claim 4,
wherein the instructions further cause the information handling system to:
determine one or more curve determinations associated with the display; and
determine, from the one or more curve determinations, a plurality of vectors, each of the plurality of vectors is orthogonal to the display at a respective position of the display; and
wherein, to determine the second plurality of brightness settings of the pixels of the display based at least on the first plurality of brightness settings and the one or more of the angle and the distance associated with the second observation point, the information handling system is further configured to determine the second plurality of brightness settings of the pixels of the display further based at least on the plurality of vectors.

6. The information handling system of claim 1, wherein, to determine the second plurality of brightness settings, the information handling system is further configured to adjust the first plurality of brightness settings.

7. The information handling system of claim 6, wherein, to determine the second plurality of brightness settings, the information handling system is further configured to:
access a lookup table that includes brightness adjustments associated with a plurality of angles; and
look up, from the lookup table, adjustments to the first plurality of brightness settings.

8. A method, comprising:
determining a first plurality of brightness settings of pixels of a display based on a first observation point;
determining one or more of an angle and a distance associated with a second observation point with respect to the first observation point;
a graphics processing unit determining a second plurality of brightness settings of the pixels of the display based at least on the first plurality of brightness settings and the one or more of the angle and the distance associated with the second observation point; and
displaying, via the display, an image utilizing the second plurality of brightness settings.

9. The method of claim 8, further comprising:
receiving information from a tracking device;
wherein the determining the one or more of the angle and the distance associated with the second observation point with respect to the first observation point includes determining the one or more of the angle and the distance associated with the second observation point with respect to the first observation point based at least on the information from the tracking device.

10. The method of claim 9, wherein the tracking device includes one or more image sensors.

11. The method of claim 8, wherein the display has one or more curves.

12. The method of claim 11, further comprising:
determining one or more curve determinations associated with the display; and
determining, from the one or more curve determinations, a plurality of vectors, each of the plurality of vectors is orthogonal to the display at a respective position of the display;
wherein the graphics processing unit determining the second plurality of brightness settings of the pixels of the display based at least on the first plurality of brightness settings and the one or more of the angle and the distance associated with the second observation point includes the graphics processing unit determining the second plurality of brightness settings of the pixels of the display further based at least on the plurality of vectors.

13. The method of claim 8, wherein the graphics processing unit determining the second plurality of brightness settings includes the graphics processing unit adjusting the first plurality of brightness settings.

14. The method of claim 13, wherein the graphics processing unit determining the second plurality of brightness settings includes:
- the graphics processing unit accessing a lookup table that includes brightness adjustments associated with a plurality of angles; and
- the graphics processing unit looking up, from the lookup table, adjustments to the first plurality of brightness settings.

15. A computer-readable non-transitory memory medium that includes instructions that, when executed by at least one processor of an information handling system, cause the information handling system to:
- determine a first plurality of brightness settings of pixels of a display based on a first observation point;
- determine one or more of an angle and a distance associated with a second observation point with respect to the first observation point;
- determine a second plurality of brightness settings of the pixels of the display based at least on the first plurality of brightness settings and the one or more of the angle and the distance associated with the second observation point; and
- display, via the display, an image utilizing the second plurality of brightness settings.

16. The computer-readable non-transitory memory medium of claim 15, wherein
- the instructions further cause the information handling system to receive information from a tracking device; and
- wherein, to determine the one or more of the angle and the distance associated with the second observation point with respect to the first observation point, the instructions further cause the information handling system to determine the one or more of the angle and the distance associated with the second observation point with respect to the first observation point based at least on the information from the tracking device.

17. The computer-readable non-transitory memory medium of claim 16, wherein the tracking device includes one or more image sensors.

18. The computer-readable non-transitory memory medium of claim 15, wherein the display has one or more curves.

19. The computer-readable non-transitory memory medium of claim 18,
- wherein the instructions further cause the information handling system to:
  - determine one or more curve determinations associated with the display; and
  - determine, from the one or more curve determinations, a plurality of vectors, each of the plurality of vectors is orthogonal to the display at a respective position of the display; and
- wherein, to determine the second plurality of brightness settings of the pixels of the display based at least on the first plurality of brightness settings and the one or more of the angle and the distance associated with the second observation point, the instructions further cause the information handling system to determine the second plurality of brightness settings of the pixels of the display further based at least on the plurality of vectors.

20. The computer-readable non-transitory memory medium of claim 15, wherein, to determine the second plurality of brightness settings, the instructions further cause the information handling system to adjust the first plurality of brightness settings.

* * * * *